US009790432B2

(12) United States Patent
Powell et al.

(10) Patent No.: US 9,790,432 B2
(45) Date of Patent: *Oct. 17, 2017

(54) METHODS AND SYSTEMS FOR PROCESSING CELLULOSIC BIOMASS

(71) Applicant: SHELL OIL COMPANY, Houston, TX (US)

(72) Inventors: Joseph Broun Powell, Houston, TX (US); Juben Nemchand Chheda, Houston, TX (US); Lamar Lane Joffrion, Sugar Land, TX (US); Philip Walter Anderson, Bellaire, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,435

(22) Filed: Sep. 29, 2015

(65) Prior Publication Data

US 2016/0096995 A1    Apr. 7, 2016

Related U.S. Application Data

(60) Provisional application No. 62/058,625, filed on Oct. 1, 2014.

(51) Int. Cl.
  *C10G 1/06*  (2006.01)
  *C10G 3/00*  (2006.01)
  (Continued)

(52) U.S. Cl.
  CPC .............. *C10G 1/065* (2013.01); *C08H 8/00* (2013.01); *C10G 1/002* (2013.01); *C10G 1/083* (2013.01);
  (Continued)

(58) Field of Classification Search
  None
  See application file for complete search history.

(56) References Cited

U.S. PATENT DOCUMENTS

| 6,030,915 | A  | 2/2000  | de Boer |
| 6,127,229 | A1 | 12/2014 | Powell et al. |
| 8,921,629 | B2 | 12/2014 | Powell et al. |
| 2010/0192457 | A1 | 8/2010 | Tsurutani et al. |
| 2010/0236988 | A1 | 9/2010 | Gabrielov et al. |
| 2012/0167876 | A1 | 7/2012 | Qiao et al. |
| 2012/0317872 | A1 | 12/2012 | Powell et al. |
| 2013/0152456 | A1 | 6/2013 | Ppwell |
| 2013/0152457 | A1 | 6/2013 | Powell et al. |
| 2013/0152458 | A1 | 6/2013 | Powell et al. |
| 2013/0158308 | A1 | 6/2013 | Powell |
| 2014/0000154 | A1 | 1/2014 | Powell |

(Continued)

FOREIGN PATENT DOCUMENTS

WO    2014179306    11/2014

OTHER PUBLICATIONS

International Search Report dated Dec. 4, 2015 of PCT/US2015/052819 filed Sep. 29, 2015.

*Primary Examiner* — Philip Louie

(57) ABSTRACT

Digestion of cellulosic biomass solids may be complicated by release of lignin therefrom. Methods and systems for processing a reaction product containing lignin-derived products, such as phenolics, can comprise hydrotreating the reaction product to convert the lignin-derived products to desired higher molecular weight compounds. The methods and systems can further include separating the higher molecular weight compounds from unconverted products, such as unconverted phenolics, and recycling the unconverted phenolics for use as at least a portion of the digestion solvent and for further conversion to desired higher molecular weight compounds with additional hydrotreatment. The methods and systems can further include a further hydrotreatment step configured for additional lignin conversion and/or a further hydrotreatment step configured for generating hydrogen.

16 Claims, 3 Drawing Sheets

(51) Int. Cl.
    *C08H 8/00*          (2010.01)
    *C10G 1/00*          (2006.01)
    *C10G 1/08*          (2006.01)
    *D21C 3/20*          (2006.01)
    *D21C 3/22*          (2006.01)
    *D21C 11/00*        (2006.01)

(52) U.S. Cl.
    CPC .................. *C10G 3/42* (2013.01); *C10G 3/50* (2013.01); *C10G 3/56* (2013.01); *C10G 3/57* (2013.01); *D21C 3/20* (2013.01); *D21C 3/222* (2013.01); *D21C 11/0007* (2013.01); *C10G 2300/1014* (2013.01); *C10G 2300/4081* (2013.01); *C10G 2300/802* (2013.01); *C10G 2300/805* (2013.01); *Y02P 30/20* (2015.11)

(56) References Cited

U.S. PATENT DOCUMENTS

| | | |
|---|---|---|
| 2014/0004015 A1 | 1/2014 | Denton et al. |
| 2014/0005444 A1 | 1/2014 | Komplin et al. |
| 2014/0005445 A1 | 1/2014 | Komplin et al. |
| 2014/0117276 A1 | 5/2014 | Powell et al. |
| 2014/0117277 A1 | 5/2014 | Powell et al. |
| 2014/0121420 A1 | 5/2014 | Powell et al. |
| 2014/0128639 A1 | 5/2014 | Powell et al. |
| 2014/0174432 A1 | 6/2014 | Powell |
| 2014/0275513 A1 | 9/2014 | Powell |
| 2014/0275514 A1 | 9/2014 | Powell et al. |
| 2014/0345190 A1 | 11/2014 | Huo et al. |

METHODS AND SYSTEMS FOR PROCESSING CELLULOSIC BIOMASS

The present application claims priority to U.S. Provisional Application No. 62/058,625, filed on Oct. 1, 2014, the disclosure of which is incorporated by reference herein in its entirety.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of any prior art.

The present disclosure generally relates to digestion of cellulosic biomass solids, and, more specifically, to methods for processing a reaction product comprising lignin that may be obtained by digestion of cellulosic biomass.

A number of substances of commercial significance may be produced from natural sources, including biomass. Cellulosic biomass may be particularly advantageous in this regard due to the versatility of the abundant carbohydrates found therein in various forms. As used herein, the term "cellulosic biomass" refers to a living or formerly living biological material that contains cellulose. The lignocellulosic material found in the cell walls of higher plants is the world's largest source of carbohydrates. Materials commonly produced from cellulosic biomass may include, for example, paper and pulpwood via partial digestion, biofuels, including bioethanol by fermentation.

Development of fossil fuel alternatives derived from renewable resources have received recent attention. Cellulosic biomass has garnered particular attention in this regard due to its abundance and the versatility of the various constituents found therein, particularly cellulose and other carbohydrates. Despite promise and intense interest, the development and implementation of bio-based fuel technology has been slow. Existing technologies have heretofore produced fuels having a low energy density (e.g., bioethanol) and/or that are not fully compatible with existing engine designs and transportation infrastructure (e.g., methanol, biodiesel, Fischer-Tropsch diesel, hydrogen, and methane). Moreover, conventional bio-based processes have typically produced intermediates in dilute aqueous solutions (>50% water by weight) that are difficult to further process. Energy- and cost-efficient processes for processing cellulosic biomass into fuel blends having similar compositions to fossil fuels would be highly desirable to address the foregoing issues and others.

Further, in addition to the desired carbohydrates, other substances may be present within cellulosic biomass that can be especially problematic to deal with in an energy- and cost-efficient manner. For example, during cellulosic biomass processing, the significant quantities of lignin present in cellulosic biomass may lead to fouling of processing equipment, potentially leading to costly system down time. The significant lignin quantities can also lead to realization of a relatively low conversion of the cellulosic biomass into useable substances per unit weight of feedstock.

As evidenced by the foregoing, the efficient conversion of cellulosic biomass into fuel blends and other materials is a complex problem that presents immense engineering challenges. The present disclosure addresses these challenges and provides related advantages as well.

SUMMARY

The present disclosure generally relates to digestion of cellulosic biomass solids, and, more specifically, to methods for processing lignin-derived phenolics that may be obtained in conjunction with hydrothermal digestion of cellulosic biomass solids. According to certain aspects, there is provided a method comprising: providing a first reaction content to a reactor in a first reaction zone, where the first reaction content comprises cellulosic biomass solids, molecular hydrogen, a catalyst capable of activating molecular hydrogen, and a digestion solvent; heating the first reaction content to form a first reaction product comprising phenolics and an alcoholic component; providing a second reaction content to a first reactor in a second reaction zone, where the second reaction content comprises the first reaction product, molecular hydrogen, and a catalyst capable of activating molecular hydrogen; heating the second reaction content to form a second reaction product; providing a third reaction content to a second reactor in the second reaction zone, where the third reaction content comprises the second reaction product, molecular hydrogen, and a catalyst capable of activating molecular hydrogen; heating the third reaction content to form a third reaction product comprising unconverted phenolics and hydrocarbons converted from phenolics; separating an unconverted phenolics fraction from the third reaction product; providing a first portion of the unconverted phenolics fraction to the reactor in the first reaction zone; and providing a second portion of the unconverted phenolics fraction to at least one of the first reactor and the second reactor in the second reaction zone.

The hydrocarbon compounds include at least one of an alkane, an alkene, a cycloalkane, a cycloalkene, and an alkyl derivative or substituent of the cycloalkane and/or cycloalkene, such as any one of cyclohexane, cyclohexene, propyl cyclopentane, propyl cyclopentene, propyl cyclohexane, propyl cyclohexene, anisole, propyl benzene, cyclohexanone, methyl cyclohexanone, methyl propyl benzene, and any combination thereof.

In some embodiments, at least one of the second and third reaction contents has a concentration of phenolics of 50% or less by weight based on the total weight of the respective reaction content. In some embodiments, the second reaction content has a water concentration of at least 10% by weight based on the total weight of the second reaction content. In some embodiments, the unconverted phenolics fraction comprises greater than 50% of the amount of phenolics in the third reaction product from which the unconverted phenolics fraction is separated.

At least one of the second and third reactors can have a pressure of less than 200 bar.6. At least a portion of triols and glycol in the alcoholic component can be converted to monohydric alcohols. In some embodiments, the first reaction content is heated to a temperature in a range of about 190 to 260 degrees. In some embodiments, the second and third reaction contents are heated to a temperature in a range of about 210 to 300 degrees C.

The reactor in the first reaction zone can have a total pressure of at least 30 bar. The first and second reactors in the second reaction zone each can have a total pressure of at least 30 bar. At least one of the first and second reactors in the second reaction zone can have a total pressure that is lower than a total pressure of the reactor in the first reaction zone.

In some embodiments, the first reactor in the second reaction zone comprises an ebulatting bed reactor and the second reactor in the second reaction zone comprises a fixed bed reactor or a trickle bed reactor. In some embodiments, the catalyst in at least one of the first and second reactors in the second reaction content comprises fluidly mobile catalyst particulates. In some embodiments, at least one of the first reaction zone and the second reaction zone comprises a slurry reactor. The method can further comprise increasing the catalytic activity in at least one of the first and second reactors in the second reaction zone to increase hydrogen generation.

According to aspects of the present disclosure, there is provided a system comprising a first reaction zone comprising a reactor configured heat a first reaction content comprising cellulosic biomass solids, molecular hydrogen, a catalyst capable of activating molecular hydrogen, and a digestion solvent to form a first reaction product comprising phenolics and an alcoholic component; a second reaction zone comprising: a first reactor in fluid communication with the reactor in the first reaction zone to receive the first reaction product, wherein the first reactor in the second reaction zone is configured to heat a second reaction content comprising the first reaction product, molecular hydrogen, and a catalyst capable of activating molecular hydrogen to form a second reaction product comprising unconverted phenolics and hydrocarbons converted from phenolics; a second reactor in fluid communication with the first reactor in the second reaction zone to receive the second reaction product, wherein the second reactor in the second reaction zone is configured to heat a third reaction content comprising the second reaction product, molecular hydrogen, and a catalyst capable of activating molecular hydrogen to form a third reaction product comprising unconverted phenolics and hydrocarbons converted from phenolic; and a separation zone is in fluid communication with the second reactor in the second reaction zone to receive the third reaction product, wherein the separation zone is configured to separate an unconverted phenolics fraction from the second reaction product; where the separation zone is in fluid communication with the reactor in the first reaction zone to provide a first portion of the unconverted phenolics fraction to said reactor in the first reaction zone; and where the separation zone is in fluid communication with a reactor in the second reaction zone to provide a second portion of the unconverted phenolics fraction to said reactor in the second reaction zone.

In some embodiments, the system further comprises a catalyst removal unit in fluid communication with the first reactor and with the second reactor in the second reaction zone, where the catalyst removal unit comprises: a first outlet in fluid communication with the reactor in the second reaction zone; and a second outlet in fluid communication with an input of the reactor in the first reaction zone.

In some embodiments, the system further comprises a flasher comprising: an inlet in fluid communication with an outlet of the first reactor in the second reaction zone; an overhead outlet in fluid communication with an inlet of the second reactor in the second reaction zone; a bottom outlet in fluid communication with the catalyst removal unit. The system can further comprise a further processing reactor in fluid communication with the separation zone, wherein the further processing reactor is configured to convert at least a portion of the alcoholic component to hydrocarbons.

The features and advantages of embodiments provided by the present disclosure will be readily apparent to one having ordinary skill in the art upon a reading of the description of the embodiments that follows.

BRIEF DESCRIPTION OF THE DRAWINGS

The following figures are included to illustrate certain aspects of the present disclosure, and should not be viewed as an exclusive embodiment. The subject matter disclosed is capable of considerable modifications, alterations, combinations, and equivalents in form and function, as will occur to one having ordinary skill in the art and the benefit of this disclosure.

DETAILED DESCRIPTION

Figure 1:
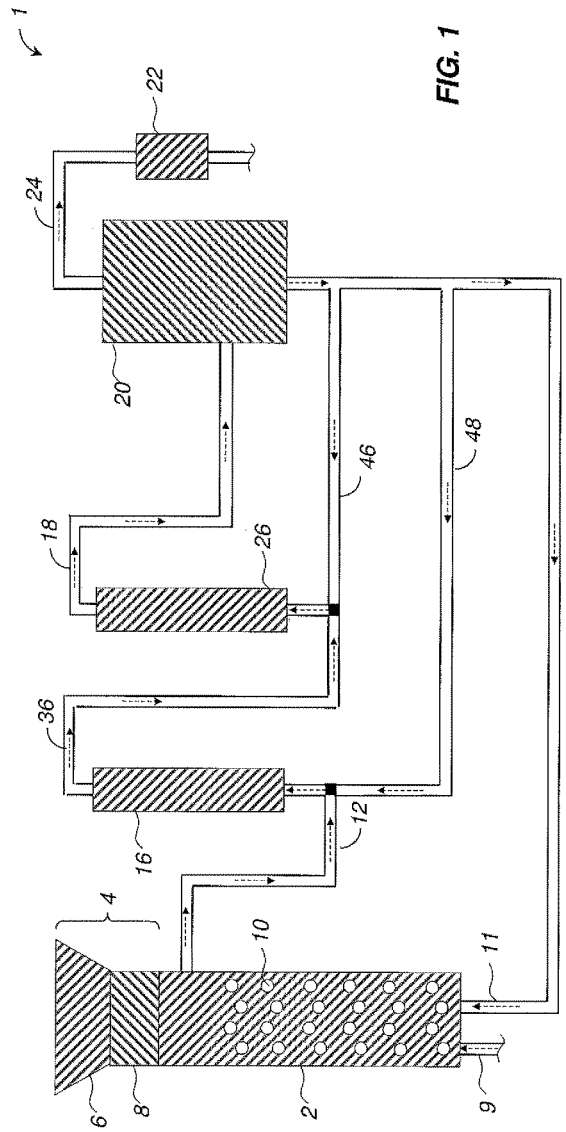
FIG. 1 shows a schematic of a first illustrative embodiment for processing cellulosic biomass according some aspects provided by this disclosure.

The present disclosure generally provides methods for processing cellulosic biomass into a fuel product, particularly through hydrothermal reactions. Cellulosic biomass is particularly advantageous because of the versatility of the abundant carbohydrates found therein in various forms. As used herein, the term "cellulosic biomass" refers to a living or formerly living biological material that contains cellulose. The lignocellulosic material found in the cell walls of higher plants is one of the world's largest source of carbohydrates.

Plants have primary cell walls and secondary cell walls. The primary cell wall contains three major polysaccharides (cellulose, pectin, and hemicellulose) and one group of glycoproteins. The secondary cell wall also contains polysaccharides polymeric lignin that is covalently crosslinked to hemicellulose. The complex mixture of constituents that is co-present with the cellulose can make its processing difficult, as discussed hereinafter. Lignin, in particular, may be an especially difficult constituent to deal with.

When converting cellulosic biomass into fuel blends and other materials, cellulose and other complex carbohydrates therein can be extracted and transformed into simpler organic molecules, which can be further processed thereafter. Digestion is one way in which cellulose and other complex carbohydrates may be converted into a more usable form. Digestion processes can break down cellulose and other complex carbohydrates within cellulosic biomass into simpler, soluble carbohydrates that are suitable for further transformation through downstream further processing reactions. As used herein, the term "soluble carbohydrates" refers to monosaccharides or polysaccharides that become solubilized in a digestion process.

The issues associated with converting cellulosic biomass into fuel blends in an energy- and cost-efficient manner using digestion are not only complex, but they are entirely different than those that are encountered in the digestion processes commonly used in the paper and pulpwood industry. Since the intent of cellulosic biomass digestion in the paper and pulpwood industry is to retain a solid material (e.g., wood pulp), incomplete digestion is usually performed at low temperatures (e.g., less than about 200° C.) for a fairly short period of time (e.g., between two to four hours). In contrast, digestion processes suitable for converting cellulosic biomass into fuel blends and other materials are ideally configured to maximize yields by solubilizing as much of the original cellulosic biomass charge as possible in a high-throughput manner. Paper and pulpwood digestion processes also typically remove lignin from the raw cellulosic biomass prior to pulp formation. Although digestion processes used in connection with forming fuel blends and other materials may likewise remove lignin prior to digestion, these extra process steps may impact the energy efficiency and cost of the biomass conversion process. The presence of lignin during high-conversion cellulosic biomass digestion may be particularly problematic.

Production of soluble carbohydrates for use in fuel blends and other materials via routine modification of paper and pulpwood digestion processes is not believed to be economically feasible for a number of reasons. Simply running the digestion processes of the paper and pulpwood industry for a longer period of time to produce more soluble carbohydrates is undesirable from a throughput standpoint. Use of digestion promoters such as strong alkalis, strong acids, or sulfites to accelerate the digestion rate can increase process costs and complexity due to post-processing separation steps and the possible need to protect downstream components from these agents. Accelerating the digestion rate by increasing the digestion temperature can actually reduce yields due to thermal degradation of soluble carbohydrates that can occur at elevated digestion temperatures, particularly over extended periods of time. Once produced by digestion, soluble carbohydrates are very reactive and can rapidly degrade to produce caramelans and other heavy ends degradation products, especially under higher temperature conditions, such as above about 150 degrees C. Use of higher digestion temperatures can also be undesirable from an energy efficiency standpoint. Any of these difficulties can defeat the economic viability of fuel blends derived from cellulosic biomass.

A particularly effective manner in which soluble carbohydrates may be formed is through hydrothermal digestion, and in which the soluble carbohydrates may be converted into more stable compounds is through subjecting them to one or more catalytic reduction, which may include hydrogenation and/or hydrogenolysis reactions. Stabilizing soluble carbohydrates through conducting one or more catalytic reduction reactions may allow digestion of cellulosic biomass to take place at higher temperatures than would otherwise be possible without unduly sacrificing yields. Depending on the reaction conditions and catalyst used, reaction products formed as a result of conducting one or more catalytic reduction reactions on soluble carbohydrates may comprise one or more alcohol functional groups, particularly including triols, glycol, monohydric alcohols, and any combination thereof, some of which may also include a residual carbonyl functionality (e.g., an aldehyde or a ketone). The compounds in the alcoholic component can be described as oxygenates where the compounds comprise one or more oxygen-containing functional group, such as a hydroxyl group or a carbonyl group. Non-limiting examples of oxygenates include an aldehyde, a ketone, an alcohol, furan, an ether, or any combination thereof. Such reaction products are more thermally stable than soluble carbohydrates and may be readily transformable into fuel blends and other materials through conducting one or more downstream further processing reactions. In addition, the foregoing types of reaction products are good solvents in which a hydrothermal digestion may be performed, thereby promoting solubilization of soluble carbohydrates as their reaction products.

Hydrothermal digestion of a cellulosic biomass can include heating of the cellulosic biomass and a digestion solvent in the presence of molecular hydrogen and a catalyst capable of activating the molecular hydrogen (which can also be referred to herein as a "hydrogen-activating catalyst" or "hydrocatalytic catalyst"). In such approaches, the hydrothermal digestion of cellulosic biomass and the catalytic reduction of soluble carbohydrates produced therefrom may take place in the same vessel, which can be referred to as "in situ catalytic reduction reaction processes." As such, digestion processes suitable for converting cellulosic biomass into fuel blends and other materials are preferably configured to maximize yields by solubilizing as much of the original cellulosic biomass charge as possible in a high-throughput manner. In situ catalytic reduction reaction processes may also be particularly advantageous from an energy efficiency standpoint, since hydrothermal digestion of cellulosic biomass is an endothermic process, whereas catalytic reduction reactions are exothermic. Thus, the excess heat generated by the in situ catalytic reduction reaction(s) may be utilized to drive the hydrothermal digestion with little opportunity for heat transfer loss to occur, thereby lowering the amount of additional heat energy input needed to conduct the digestion.

While soluble carbohydrates and alcoholic compounds formed therefrom are desirable products, processing of cellulosic biomass also needs to address the presence of lignin during high-conversion cellulosic biomass digestion, which may be particularly problematic. Although a digestion solvent may also promote solubilization of lignin, the lignin may still be difficult to effectively process due to its poor solubility and precipitation propensity. In particular, during cellulosic biomass processing, the significant quantities of lignin present in cellulosic biomass may lead to fouling of processing equipment, potentially leading to costly system down time. The significant lignin quantities can also lead to realization of a relatively low conversion of the cellulosic biomass into useable substances per unit weight of cellulosic biomass feedstock.

In light of the advantages of hydrothermal digestion and catalytic reduction and problems presented by lignin the present disclosure provides methods and systems for processing cellulosic biomass by converting phenolics generated from hydrothermal processing of cellulosic biomass to more desirable products, particularly hydrocarbon compounds. The terms "hydrocarbon compounds," "hydrocarbons," or related terms refer to compounds comprising hydrogen and carbon atoms that do not have a phenolic functional group, which is a hydroxyl group (—OH) bonded to an aromatic hydrocarbon group. Illustrative, non-limiting hydrocarbon compounds include alkanes, alkenes, cycloalkanes and their alkyl substituents or derivatives, and cycloalkenes and their alkyl substituents or derivatives, which can be suitable for use in fuel composition, for instance gasoline or diesel. For instance, illustrative hydrocarbon compounds can include but are not limited to cyclohexane, cyclohexene, propyl cyclopentane, propyl cyclopentene, propyl cyclohexane, propyl cyclohexene, anisole, propyl benzene, cyclohexanone, methyl cyclohexanone, and methyl propyl benzene.

Cellulosic biomass processing can provide for lignin reversion, e.g., reversion of lignin to phenols and conversion of phenolics derived from lignin to hydrocarbons. As mentioned, processing of cellulosic biomass can include hydrothermally digesting cellulosic biomass and carrying out a catalytic reduction reaction of soluble carbohydrates. This can be achieved via in situ catalytic reduction reaction, which involves heating the cellulosic biomass and a digestion solvent in the presence of molecular hydrogen and a catalyst capable of activating molecular hydrogen. The hydrothermal digestion and catalytic reduction can generate a first reaction product comprising phenolics derived from lignin in the cellulosic biomass and an alcoholic component formed from a catalytic reduction reaction of soluble carbohydrates derived from the cellulosic biomass. The term "alcoholic component" refers to an oxygenate where the oxygenate can be a monohydric alcohol, a glycol, a triol, or any combination thereof. As used herein, the term "glycol" will refer to compounds containing two alcohol functional groups, two alcohol functional groups and a carbonyl functionality, or any combination thereof. As used herein, the term "carbonyl functionality" will refer to an aldehyde functionality or a ketone functionality. In some embodiments, a glycol may comprise a significant fraction of the reaction product. Although a glycol may comprise a significant fraction of the reaction product, it is to be recognized that other alcohols, including triols and monohydric alcohols, for example, may also be present. Further, any of these alcohols may further include a carbonyl functionality. As used herein, the term "triol" will refer to compounds containing three alcohol functional groups, three alcohol functional groups and a carbonyl functionality, and any combination thereof. As used herein, the term "monohydric alcohol" will refer to compounds containing one alcohol functional group, one alcohol functional group and a carbonyl functionality, and any combination thereof. The term "phenolics" or "phenols" has its ordinary meaning, which generally refers to a class of compounds that contain a hydroxyl group (—OH) bonded to an aromatic hydrocarbon group.

The in situ catalytic reduction reaction can be considered a first hydrothermal reaction. At least a portion of the phenolics in the first reaction product can be converted to hydrocarbon compounds by a second hydrothermal reaction where the first reaction product is heated in the presence of molecular hydrogen and catalyst capable activating molecular hydrogen. Optionally, at least some of the alcoholic component in the first reaction product, such as glycol or triol, can also be converted to monohydric alcohol in the second hydrothermal reaction.

Unconverted phenolics—phenolics that have not been converted to hydrocarbons (meaning compounds that still contain a hydroxyl group bonded to an aromatic hydrocarbon group)—may be recycled or returned to the first hydrothermal reaction and the second hydrothermal reaction so they can continue to be converted to hydrocarbons. For instance, phenolics that have not been converted may be used as at least a portion of the digestion solvent in the first hydrothermal reaction. Phenolics that have not been converted may also be recycled to the second hydrothermal reaction where they are heated with the first reaction product to generate additional hydrocarbons. As such, it may be said that—in principle—lignin in the form of phenolics can potentially be recycled until they are substantially eliminated through one or more hydrothermal digestion, catalytic reduction, and reversion reactions.

The first reaction product may contain catalyst from the hydrothermal digestion reaction accumulated therein. As such, the catalyst in the first hydrothermal reaction generating the first reaction product may be the same as the catalyst in the second hydrothermal reaction generating certain hydrocarbons from phenolics, and optionally monohydric alcohol from glycol or triol. If catalyst accumulated in the first reaction product is removed, the second hydrothermal reaction may use a different catalyst than the first hydrothermal reaction. The temperature to which the cellulosic biomass, digestion solvent, molecular hydrogen, and catalyst are heated in the first hydrothermal reaction may be lower than the temperature to which the first reaction product, molecular hydrogen, and catalyst are heated in the second hydrothermal reaction. Hydrogen may be generated in the second hydrothermal reaction, which may be used in the hydrothermal reactions themselves. Various conditions of the hydrothermal reactions may be optimized for hydrogen reaction and/or lignin reversion.

It had been found that a reaction content with a low phenolics concentration can provide better yields of hydrocarbons than one with a high concentration of phenolics. That is, lignin reversion can be better when the concentration of phenolics in the reaction content of a hydrothermal reaction subsequent to the digestion is low versus when the phenolics concentration is high. For instance, low phenolics concentration in subsequent hydrothermal reactions (e.g., the second and/or third reaction content) is a concentration of 50% or less by weight based on the total weight of the content of the respective hydrothermal reaction. Non-limiting illustrative phenolics concentrations of the reaction content in subsequent hydrothermal reactions can be in a range of about 0.1% to 50% by weight, and any amount in between, including less than 45%, less than 40%, less than 35%, less than 30%, less than 25%, less than 20%, less than 15%, less than 10%, or less than 5% by weight, based on the total content weight of the respective hydrothermal reaction.

Lignin reversion, including conversion of lignin to phenols and/or conversion of phenolics to hydrocarbon compounds, can be improved if the conversion is accomplished in the presence of water. That is the phenolics concentration in a hydrothermal reaction subsequent to the digestion having a phenolics concentration of 50% or less by weight of the content of the second hydrothermal reaction can be achieved at least in part with water. For instance, the concentration of water in the hydrothermal reaction subsequent to digestion (e.g., the second and/or third reaction content) can be at least 10% by weight based on the total weight of the respective reaction content. Non-limiting illustrative water concentration of the reaction content subsequent to digestion ((e.g., the second and/or third reaction content) can be at least 10%, at least 15%, at least 20%, at least 25%, at least 30%, at least 35%, or at least 40% by weight, based on the total content weight of the respective reaction content.

Optionally, as mentioned above, the second hydrothermal reaction can also provide for conversion of at least some of the alcoholic component, such as glycol or triols, in the first reaction product to monohydric alcohol. As can be seen, the processes and systems described herein can reduce phenolics contamination of desirable products by providing for conversion of phenolics, including unconverted phenolics, into desirable products such as hydrocarbons. In particular, the second hydrothermal reaction and can hydrotreat compounds that are hydrotreatable to produce products, such as certain hydrocarbons and optionally monohydric alcohol, that have boiling points further away from phenolics. The greater difference in boiling points can facilitate separation of phenolics still present in the reaction product from desired compounds that are intended for further processing into fuel products.

Accordingly, the present disclosure provides a method comprising providing a first reaction content to a reactor in a first reaction zone, where the first reaction content comprises cellulosic biomass solids, molecular hydrogen, a catalyst capable of activating molecular hydrogen, and a digestion solvent; heating the first reaction content to form a first reaction product comprising phenolics and an alcoholic component; providing a second reaction content to a first reactor in a second reaction zone, where the second reaction content comprises the first reaction product, molecular hydrogen, and a catalyst capable of activating molecular hydrogen; heating the second reaction content to form a second reaction product; providing a third reaction content to a second reactor in the second reaction zone, where the third reaction content comprises the second reaction product, molecular hydrogen, and a catalyst capable of activating molecular hydrogen; heating the third reaction content to form a third reaction product comprising unconverted phenolics and hydrocarbons converted from phenolics; separating an unconverted phenolics fraction from the third reaction product; providing a first portion of the unconverted phenolics fraction to the reactor in the first reaction zone; and providing a second portion of the unconverted phenolics fraction to at least one of the first reactor and the second reactor in the second reaction zone.

Unless otherwise specified, it is to be understood that use of the terms "biomass" or "cellulosic biomass" may be synonymous. The cellulosic biomass may be in any size, shape, or form. The cellulosic biomass may be natively present in any of these solid sizes, shapes, or forms, or they may be further processed prior to digestion. The cellulosic biomass may be chopped, ground, shredded, pulverized, and the like to produce a desired size prior to hydrothermal digestion. The cellulosic biomass may be washed (e.g., with water, an acid, a base, combinations thereof, and the like) prior to digestion taking place.

Any type of suitable cellulosic biomass source may be used. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable cellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, duckweed and any combination thereof. Leaves, roots, seeds, stalks, husks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

Illustrative carbohydrates that may be present in cellulosic biomass solids include, for example, sugars, sugar alcohols, celluloses, lignocelluloses, hemicelluloses, and any combination thereof. As mentioned, once soluble carbohydrates have been produced through hydrothermal digestion according to the embodiments described herein, the soluble carbohydrates may be transformed into a more stable reaction product comprising an alcoholic component, which may comprise a monohydric alcohol, a glycol, a triol, or any combination thereof in various embodiments.

Any type of suitable catalyst capable of activating hydrogen can be used in any reactor suitable for use with the selected catalyst(s) for the first and second hydrothermal reactions. For example, at least one of the first and second hydrothermal reactions can be carried out using fluidly mobile catalyst particles that can be at least partially suspended in a fluid phase via gas flow, liquid flow, mechanical agitation, or any combination thereof in a reactor. Various conditions can be implemented so that the fluidly mobile catalyst particles do not get carried out of the reactor by the fluid flowing through the reactor. A reactor operating under these circumstances can be called an ebullating bed reactor in part because the catalyst particles remain in the reactor to form a catalytic bed. It is understood that one of ordinary skill in the art can select the various conditions to achieve an ebullating bed reactor. For instance, a suitable concentration of catalyst and/or catalyst size can be selected to obtain the desired reactor conditions.

On the other hand, the conditions can be modified so that the fluidly mobile catalyst particles flow with the biomass solids through the reactor. A reactor operating under these circumstances can be called a slurry reactor. Adequate catalyst distribution is desirable in a slurry reactor so that soluble carbohydrates formed during hydrothermal digestion may be intercepted and converted into more stable compounds before they have had an opportunity to significantly degrade, even under thermal conditions that otherwise promote their degradation.

The second hydrothermal reaction can also be carried out using a catalyst that does not comprise fluidly mobile catalyst particles. For example, the second hydrothermal reaction can be carried out in a fixed bed reactor or a trickle bed reactor, which are known by one of ordinary skill in the art. For instance, during operation of a fixed bed or trickle bed reactor and fluid is flowing through the reactor, the height of the bed does not increase to greater than 10% as compared to when fluid is not flowing through the reactor.

If a reactor with a catalyst that does not comprise fluidly mobile catalyst particles is used in the second hydrothermal reaction, a possible issue may be clogging of the bed by cellulosic particulates in the first reaction product from the digestion. As cellulosic biomass breaks apart during digestion, smaller and smaller particulates may be produced until only insoluble materials remain. Cellulosic particulates may also be present in native cellulosic biomass before digestion takes place. One way of handling cellulosic particulates can be use of a screen at a fluid outlet of the hydrothermal digestion unit to assist in maintaining the cellulosic fines therein. At a certain size, the cellulosic particulates may pass through the screen of the hydrothermal digestion unit and enter at least the reactor in the second reaction zone.

Another way to address cellulosic particulates, particularly ones that are sufficiently small to pass through screens, is the methods and systems disclosed in commonly owned U.S. Application Publication No. 2013/0152456 ("the '456 publication"), the disclosure of which is incorporated herein in its entirety. In general, the '456 publication discloses a solids separation unit to which the first reaction product can be routed to have at least a portion of the cellulosic particulates removed before it enters a reactor in the second reaction zone. The solids separation unit can comprise one or more filters, where at least one of the filters can be backflushed to remove cellulosic fines therefrom, while one or more of the other filters remain in fluid communication with an inlet of the reactor in the second reaction zone.

If more than one filter is used, the filters may be connected in parallel to one another or they may be arranged on a rotatable filter array. At least one of the filters may be backflushed while fluid flow continues through at least one of the remaining filters in a forward flow direction. In such arrangements of the plurality of filters, the first reaction product can be continually provided to a reactor in the second reaction zone. Alternatively, each of the plurality of filters may be backflushed at the same time, such that the flow of the first reaction product to the reactor in the second reaction zone is interrupted or a single filter may be used, with more frequent backflushing taking place. The one or more filters used may be of any type capable of affecting separation of solids from a fluid phase. Suitable filters may include, for example, surface filters and depth filters. Surface filters may include, for example, filter papers, membranes, porous solid media, and the like. Depth filters may include, for example, a column or plug of porous media designed to trap solids within its core structure.

Yet another way of addressing the cellulosic fines is disclosed in commonly owned U.S. Application Publication No. 2013/0158308 ("the '308 publication"), the disclosure of which is incorporated herein in its entirety. In general, like the '456 publication mentioned above, the '308 publication also discloses a solids separation unit to which the first reaction product can be routed to have at least a portion of the cellulosic particulates removed before it enters a reactor in the second reaction zone. In addition to or instead of the one or more filters, the solids separation unit of the '308 publication can also comprise a centripetal force-based separation mechanism. Such centripetal force-based separation mechanism can also be commonly referred to in the art as centrifugal force-based separation mechanisms and/or vortex-based separation mechanisms. For instance, a suitable centripetal force-based separation mechanism may comprise a hydroclone (also known in the art as a hydrocyclone). It is understood that the processes and systems described herein can employ other suitable ways of separating or removing the cellulosic biomass particles in the first reaction product known to one of ordinary skill in the art, other than those that had been mentioned herein.

In some embodiments, catalysts capable of activating molecular hydrogen may comprise a metal such as, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for various hydrothermal reactions, such as hydrogenation and hydrogenolysis reactions, to occur at the same time or in succession of one another. In some embodiments, such catalysts may also comprise a carbonaceous pyropolymer catalyst containing transition metals (e.g., Cr, Mo, W, Re, Mn, Cu, and Cd) or Group VIII metals (e.g., Fe, Co, Ni, Pt, Pd, Rh, Ru, Ir, and Os). In some embodiments, the foregoing catalysts may be combined with an alkaline earth metal oxide or adhered to a catalytically active support. In some or other embodiments, the catalyst capable of activating molecular hydrogen may be deposited on a catalyst support that is not itself catalytically active.

In some embodiments, the catalyst used in the first and/or second hydrothermal reaction may comprise a poison-tolerant catalyst. As used herein the term "poison-tolerant catalyst" refers to a catalyst that is capable of activating molecular hydrogen without needing to be regenerated or replaced due to low catalytic activity for at least about 12 hours of continuous operation. Use of a poison-tolerant catalyst may be particularly desirable when reacting soluble carbohydrates derived from cellulosic biomass solids that have not had catalyst poisons removed therefrom. Catalysts that are not poison tolerant may also be used to achieve a similar result, but they may need to be regenerated or replaced more frequently than does a poison-tolerant catalyst.

Suitable poison-tolerant catalysts may include, for example, sulfided catalysts. In some or other embodiments, nitrided catalysts may be used as poison-tolerant catalysts. Sulfided catalysts suitable for activating molecular hydrogen are described in commonly owned United States Patent Publication 20120317872, and U.S. Pat. No. 8,921,629, each of which is incorporated herein by reference in its entirety. In more particular embodiments, the poison-tolerant catalyst may comprise a sulfided cobalt-molybdate catalyst, such as a catalyst comprising about 1-10 wt. % cobalt oxide and up to about 30 wt. % molybdenum trioxide. In other embodiments, catalysts containing Pt or Pd may also be effective poison-tolerant catalysts for use in the techniques described herein. When mediating in situ catalytic reduction reaction processes, sulfided catalysts may be particularly well suited to form reaction products comprising a substantial fraction of glycols (e.g., $C_2$-$C_6$ glycols) without producing excessive amounts of the corresponding monohydric alcohols. Although poison-tolerant catalysts, particularly sulfided catalysts, may be well suited for forming glycols from soluble carbohydrates, it is to be recognized that other types of catalysts, which may not necessarily be poison-tolerant, may also be used to achieve a like result in alternative embodiments. As will be recognized by one having ordinary skill in the art, various reaction parameters (e.g., temperature, pressure, catalyst composition, introduction of other components, and the like) may be modified to favor the formation of a desired reaction product. Given the benefit of the present disclosure, one having ordinary skill in the art will be able to alter various reaction parameters to change the product distribution obtained from a particular catalyst and set of reactants.

If fluidly mobile catalyst particles are used, sulfiding may be achieved by by dispersing the catalyst particles in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), and the like. In some embodiments, the catalyst particles may be concentrated in the fluid phase after sulfiding, and the concentrated slurry may then be introduced to the cellulosic biomass solids using fluid flow. Illustrative techniques for catalyst sulfiding that may be used in conjunction with the methods described herein are described in United States Patent Application Publication No. 20100236988 and incorporated herein by reference in its entirety.

The catalyst particles may have a particulate size of about 250 microns or less, about 100 microns or less, or about 10 microns or less. The minimum particulate size of the catalyst particles may be about 1 micron. The catalyst particles may comprise catalyst fines. As used herein, the term "catalyst fines" refers to solid catalysts having a nominal particulate size of about 100 microns or less. Catalyst fines may be generated from catalyst production processes, for example, during extrusion of solid catalysts. Catalyst fines may also be produced by grinding larger catalyst solids or during regeneration of catalyst solids. Suitable methods for producing catalyst fines are described in U.S. Pat. Nos. 6,030, 915 and 6,127,229, each of which is incorporated herein by reference in its entirety. In some instances, catalyst fines may be intentionally removed from a solid catalyst production run, since they may be difficult to sequester in some catalytic processes. Techniques for removing catalyst fines from larger catalyst solids may include, for example, sieving or like size separation processes. When conducting in situ catalytic reduction reaction processes, such as those described herein, catalyst fines may be particularly well suited, since they can be easily fluidized and distributed in the interstitial pore space of the digesting cellulosic biomass solids.

Catalysts that are not particularly poison-tolerant may also be used in conjunction with the techniques described herein. Such catalysts may include, for example, Ru, Pt, Pd, or compounds thereof disposed on a solid support such as, for example, Ru on titanium dioxide or Ru on carbon. Although such catalysts may not have particular poison tolerance, they may be regenerable, such as through exposure of the catalyst to water at elevated temperatures, which may be in either a subcritical state or a supercritical state.

The catalysts used in conjunction with the processes described herein may be operable to generate molecular hydrogen. For example, in some embodiments, catalysts suitable for aqueous phase reforming (i.e., APR catalysts) may be used. Suitable APR catalysts may include, for example, catalysts comprising Pt, Pd, Ru, Ni, Co, or other Group VIII metals alloyed or modified with Re, Mo, Sn, or other metals. Thus, in some embodiments described herein, an external hydrogen feed may not be needed in order to effectively carry out the stabilization of soluble carbohydrates by a catalytic reduction reaction. However, in other embodiments, an external hydrogen feed may be used, optionally in combination with internally generated hydrogen. In yet other embodiments, the molecular hydrogen needed may be externally supplied to the cellulosic biomass solids or the molecular hydrogen may be internally generated hydrogen. If external hydrogen is provided, the molecular hydrogen may be supplied as an upwardly directed fluid stream. Benefits of supplying an upwardly directed fluid stream are described herein.

The digestion solvent provided to the first reaction zone may comprise an organic solvent. In various embodiments, the digestion solvent may comprise an organic solvent and water. Although any organic solvent that is at least partially miscible with water may be used in the digestion solvent, particularly advantageous organic solvents are those that can be directly converted into fuel blends and other materials without being separated from the alcoholic component. That is, particularly advantageous organic solvents are those that may be co-processed during downstream further processing reactions with the alcoholic component being produced. Suitable organic solvents in this regard may include, for example, ethanol, ethylene glycol, propylene glycol, glycerol, phenolics, and any combination thereof. Other suitable organic solvents may include sugar alcohols, for example.

Even more desirably, the organic solvent may comprise a glycol or be transformable to a glycol under the conditions used for stabilizing soluble carbohydrates. In some embodiments, the digestion solvent may comprise water and glycerol. Glycerol may be a particularly advantageous organic solvent in this regard, since it comprises a good solvent for soluble carbohydrates and readily undergoes a catalytic reduction reaction to form a glycol in the presence of molecular hydrogen and a suitable catalyst. In addition, glycerol is inexpensive and is readily available from natural sources. Thus, in some embodiments, the methods described herein may comprise co-processing a glycol formed from an organic solvent, particularly glycerol, in conjunction with a glycol formed from soluble carbohydrates.

In some embodiments, the digestion solvent may further comprise a small amount of a monohydric alcohol. The presence of at least some monohydric alcohols in the digestion solvent may desirably enhance the digestion and/or the catalytic reduction reactions being conducted therein. For example, inclusion of about 1% to about 5% by weight monohydric alcohols in the digestion solvent may desirably maintain catalyst activity due to a surface cleaning effect. At higher concentrations of monohydric alcohols, bulk solvent effects may begin to predominate. In some embodiments, the digestion solvent may comprise about 10 wt. % or less monohydric alcohols, with the balance of the digestion solvent comprising water and another organic solvent. In some embodiments, the digestion solvent may comprise about 5 wt. % or less monohydric alcohols, or about 4% or less monohydric alcohols, or about 3% or less monohydric alcohols, or about 2% of less monohydric alcohols, or about 1% or less monohydric alcohols. Monohydric alcohols present in the digestion solvent may arise from any source. In some embodiments, the monohydric alcohols may be formed as a co-product with the alcoholic component being formed by the catalytic reduction reaction. In some or other embodiments, the monohydric alcohols may be formed by a subsequent catalytic reduction of the initially produced alcoholic component and thereafter returned to the cellulosic biomass solids. In still other embodiments, the monohydric alcohols may be sourced from an external feed that is in flow communication with the cellulosic biomass solids.

In some embodiments, the digestion solvent may comprise between about 1% water and about 99% water, with the organic solvent comprising the balance of the digestion solvent composition. Although higher percentages of water may be more favorable from an environmental standpoint, higher quantities of organic solvent may more effectively promote hydrothermal digestion due to the organic solvent's greater propensity to solubilize carbohydrates and promote catalytic reduction of the soluble carbohydrates. In some embodiments, the digestion solvent may comprise about 90% or less water by weight. In other embodiments, the digestion solvent may comprise about 80% or less water by weight, or about 70% or less water by weight, or about 60% or less water by weight, or about 50% or less water by weight, or about 40% or less water by weight, or about 30% or less water by weight, or about 20% or less water by weight, or about 10% or less water by weight, or about 5% or less water by weight.

Various illustrative embodiments of the biomass conversion methods and systems described herein will now be further described with reference to the drawings. When like elements are used in one or more figures, identical reference characters will be used in each figure, and a detailed description of the element will be provided only at its first occurrence. Some features of the biomass conversion systems may be omitted in certain depicted configurations in the interest of clarity. Moreover, certain features such as, but not limited to pumps, valves, gas bleeds, gas inlets, material (such as fluids) inlets, material outlets and the like have not necessarily been depicted in the figures, but their presence and function will be understood by one having ordinary skill in the art. In the figures, arrows have been drawn to depict the direction of material flow (such as liquid or gas).

Figure 2:
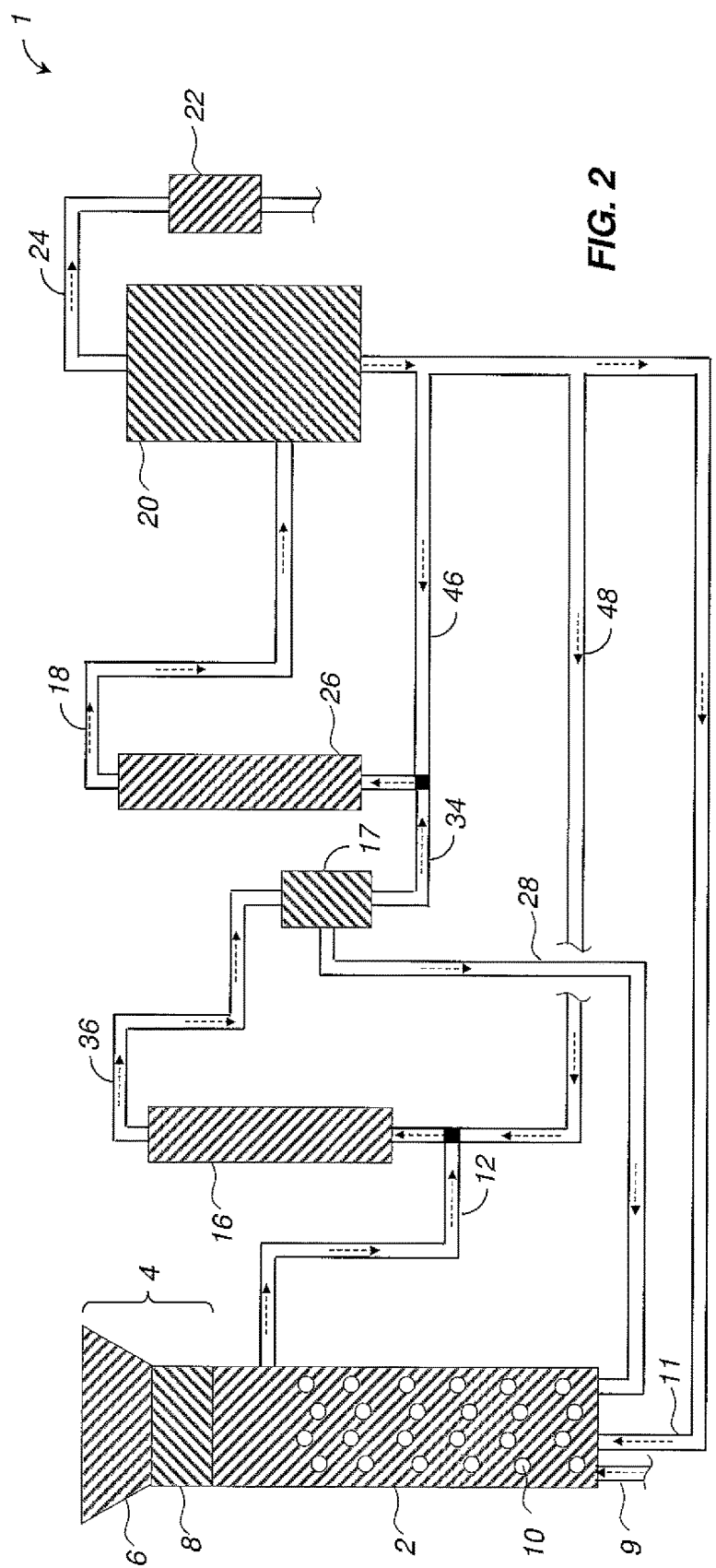
FIG. 2 shows a schematic of a second illustrative embodiment for processing cellulosic biomass according some aspects provided by this disclosure.
Figure 3:
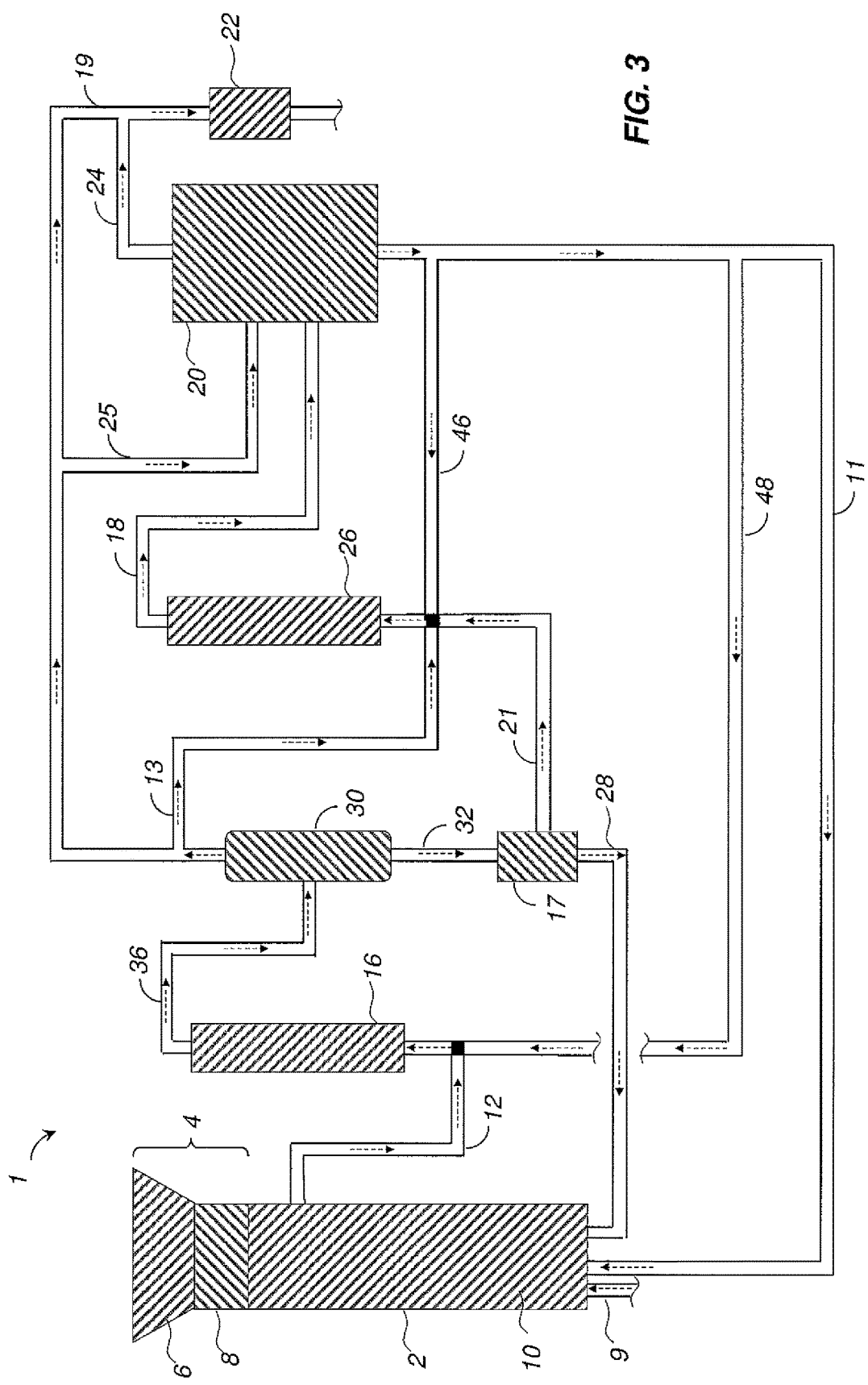
FIG. 3 shows a schematic of a third illustrative embodiment for processing cellulosic biomass according some aspects provided by this disclosure.

FIGS. 1-3 depict biomass processing system 1. A first reaction content is provided to a reactor in a first reaction zone, where the reactor is hydrothermal digestion unit 2 and the first reaction zone is not depicted. The first reaction content comprises cellulosic biomass, a catalyst capable of activating molecular hydrogen, a digestion solvent, and molecular hydrogen. The first reaction content subsequent to the initial materials provided to hydrothermal digestion unit 2 can also comprise a phenolics portion, which will be further discussed below, where the phenolics portion can serve as part of the digestion solvent. While FIGS. 1-3 shows one hydrothermal digestion unit 2 in the first reaction zone, it is understood that the first reaction zone can comprise any suitable number of hydrothermal digestion unit coupled to one another (e.g., in fluid communication with one another), such as at least two, three, four, five, six, or more hydrothermal digestion units. The catalyst capable of activating molecular hydrogen provided to hydrothermal digestion unit 2 preferably comprises fluidly mobile catalyst particles 10. For instance, hydrothermal digestion unit 2 can be a slurry reactor or an ebullating bed reactor. In the interest of clarity, the cellulosic biomass, digestion solvent, and molecular hydrogen in hydrothermal digestion unit 2 have not been depicted. If the first reaction zone has more than one hydrothermal digestion units, these units can be any combination of a slurry reactor or an ebullating bed reactor. For instance, all hydrothermal digestion units can be slurry reactors, all hydrothermal digestion units can be ebullating bed reactors, or the hydrothermal digestion units can be a combination of slurry and ebullating bed reactors.

The reaction content in hydrothermal digestion unit 2 is heated to form a first reaction product comprising phenolics and an alcoholic component. The phenolics are derived from lignin in the cellulosic biomass, and the alcoholic component is formed from soluble carbohydrates derived from cellulosic biomass. Heating of the first reaction content provides for in situ catalytic reduction where digestion of the cellulosic biomass and catalytic reduction of soluble carbohydrates takes place in the same reactor. The reaction content in hydrothermal digestion unit 2 is heated to a temperature that may be in a range of about 190 to 260 degrees C., such as in a range of about 225 to 245 degrees C. For instance, the reaction content in hydrothermal digestion unit 2 can be heated to about 190, 195, 200, 205, 210, 215, 220, 225, 230, 235, 240, 245, 250, 255, or 260 degrees C.

The heating of the first reaction content in hydrothermal digestion unit 2 is preferably performed under a pressurized state. As used herein, the term "pressurized state" refers to a pressure that is greater than atmospheric pressure (1 bar). For example, hydrothermal digestion unit 2 may have a pressure of at least about 30 bar, such as at least about 45 bar, at least about 60 bar, at least about 75 bar, at least about 90 bar, at least about 100 bar, at least about 110 bar, at least about 120 bar, or at least about 130. Hydrothermal digestion unit 2 may have a pressure of at most about 450 bar, such as at most about 330 bar, at most about 200 bar, at most about 175 bar, at most about 150 bar, or at most about 130 bar. As such, hydrothermal digestion unit 2 may have a pressure in a range of about 30 to 450 bar, such as a range of about 45 and 330 bar or in a range of about 75 to 130 bar. Hydrogen is preferably used to achieve the desired total pressure of hydrothermal digestion unit 2. For instance, hydrogen partial pressure of greater than 5 bar, greater than 10, or greater than 25 bar can be provided to hydrothermal digestion unit 2 to achieve the desired total pressure. Heating of the digestion solvent in hydrothermal digestion unit 2 in a pressurized state may allow the normal boiling point of the digestion solvent to be exceeded, thereby allowing the rate of hydrothermal digestion to be increased relative to lower temperature digestion processes.

The first reaction content in hydrothermal digestion unit 2 may have a pH in a range of about 3 to 12, such as 4 to 8 or 5 to 7. As such, the content of hydrothermal digestion unit 2 may have a pH that allows for catalytic reduction reaction to take place.

The reaction content in hydrothermal digestion unit 2 may be heated for at least 30 minutes and up to 10 hours, such as 120 minutes to 300 minutes. For example, digestion may be carried out for at least 30 minutes, at least 60 minutes, at least 120 minutes, at least 180 minutes, at least 240 minutes, at least 300 minutes, at least 360 minutes, at least 420 minutes, at least 480 minutes, at least 540 minutes, or at least 600 minutes. Digestion may be carried out at most 600 minutes, at most 540 minutes, at most 480 minutes, at most 420 minutes, at most 360 minutes, at most 300 minutes, at most 240 minutes, at most 180 minutes, at most 120 minutes, at most 60 minutes, or at most 30 minutes.

Referring to FIGS. 1-3, hydrothermal digestion unit 2 may be charged with a fixed amount of catalyst particulates 10, while cellulosic biomass solids are continuously or semi-continuously added thereto, thereby allowing hydrothermal digestion to take place in a continual manner Cellulosic biomass may be introduced to hydrothermal digestion unit 2 in the first reaction zone via solids introduction mechanism 4. As used herein, the term "continuous addition" and grammatical equivalents thereof will refer to a process in which cellulosic biomass solids are added to a hydrothermal digestion unit in an uninterrupted manner without fully depressurizing the hydrothermal digestion unit. As used herein, the term "semi-continuous addition" and grammatical equivalents thereof will refer to a discontinuous, but as-needed, addition of cellulosic biomass solids to a hydrothermal digestion unit without fully depressurizing the hydrothermal digestion unit. That is, fresh cellulosic biomass solids may be added to hydrothermal digestion unit 2 on a continual or an as-needed basis in order to replenish cellulosic biomass solids that have been digested to form soluble carbohydrates.

Solids introduction mechanism 4 may comprise loading mechanism 6 and pressure transition zone 8, which may elevate the cellulosic biomass from atmospheric pressure to a pressure near that of the operating pressure of hydrothermal digestion unit 2, particularly when hydrothermal digestion unit 2 is in a pressurized state. This allows for continuous or semi-continuous introduction of cellulosic biomass to take place without fully depressurizing hydrothermal digestion unit 2. That is, the cellulosic biomass solids may be continuously or semi-continuously added to the hydrothermal digestion unit while the hydrothermal digestion unit is in a pressurized state. Without the ability to introduce fresh cellulosic biomass to a pressurized hydrothermal digestion unit, depressurization and cooling of the hydrothermal digestion unit may take place during biomass addition, significantly reducing the energy- and cost-efficiency of the biomass conversion process.

Pressure transition zone 8 may comprise one or more suitable pressurization zones for pressurizing and introducing cellulosic biomass solids to hydrothermal digestion unit 2. Such suitable pressurization zones are described in more detail in commonly owned United States Patent Application Publications 2013/0152457 and 2013/0152458, and incorporated herein by reference in their entirety. Suitable pressurization zones described therein may include, for example, pressure vessels, pressurized screw feeders, and the like. Multiple pressurization zones may be connected in series to increase the pressure of the cellulosic biomass solids in a stepwise manner.

In various embodiments, soluble carbohydrates produced from cellulosic biomass solids may be converted into a reaction product comprising a glycol via a catalytic reduction reaction mediated by a catalyst that is capable of activating molecular hydrogen. As described in commonly owned United States Patent Publications 20140121420 and 20140128639, entitled "Methods for Production and Processing of a Glycol Reaction Product Obtained from Hydrothermal Digestion of Cellulosic Biomass Solids" and "Methods for Conversion of a Glycol Reaction Product Obtained from Hydrothermal Digestion of Cellulosic Biomass Solids Into a Dried Monohydric Alcohol Feed," each filed Oct. 31, 2012 and incorporated herein by reference in its entirety, production of glycols may present several process advantages, particularly with regard to downstream further processing reactions. In other aspects, formation of monohydric alcohols may be more desirable.

Referring to FIGS. 1-3, catalyst particulates 10 are capable of activating molecular hydrogen. At least a portion of catalyst particulates 10 may be distributed in the cellulosic biomass, particularly in hydrothermal digestion unit 2. If in situ catalytic reduction is carried out, effective distribution of catalyst particulates 10 throughout cellulosic biomass solids for in situ catalytic reduction reaction is desired. This may be achieved by using fluid flow to convey catalyst particulates 10 into the interstitial spaces within a charge of cellulosic biomass solids. As used herein, the terms "distribute," "distribution," and variants thereof refer to a condition in which catalyst particulates are present at all heights of a charge of cellulosic biomass. No particular degree of distribution is implied by use of the term "distribute" or its variants. Catalyst distribution may comprise a substantially homogeneous distribution, such that a concentration of catalyst particulates is substantially the same at all heights of a cellulosic biomass charge. Catalyst distribution may comprise a heterogeneous distribution, such that different concentrations of catalyst particulates are present at various heights of the cellulosic biomass charge. When a heterogeneous distribution of catalyst particulates is present, a concentration of catalyst particulates in the cellulosic biomass solids in hydrothermal digestion unit 2 may increase from top to bottom or decrease from top to bottom. In some embodiments, a heterogeneous distribution may comprise an irregular concentration gradient.

Catalyst particulates 10 may be conveyed into the cellulosic biomass solids in hydrothermal digestion unit 2 for distribution using fluid flow from any direction. In particular, at least a portion of catalyst particulates 10 may be conveyed by upwardly directed fluid flow, or at least that upwardly directed fluid flow be present. For instance, catalyst particulates 10 may be supplied through fluid inlet line 9 as shown in FIGS. 1-3. Such upwardly directed fluid flow may promote expansion of the cellulosic biomass solids and disfavor gravity-induced compaction that occurs during their addition and digestion. In addition, when upwardly directed fluid flow is present, there may be a reduced need to utilize mechanical stirring or like mechanical agitation techniques that might otherwise be needed to obtain an adequate catalyst distribution.

Suitable techniques for using fluid flow to distribute catalyst particulates 10 within cellulosic biomass solids are described in commonly owned United States Patent Publications 20140005445 and 20140005444, (PCT/US2013/048239 and PCT/US2013/048248) and incorporated herein by reference in its entirety. As described therein, cellulosic biomass solids may have at least some innate propensity for retaining catalyst particulates 10 being conveyed by fluid flow, and at least a portion of the cellulosic biomass solids may be sized to better promote such retention. In addition, using fluid flow, particularly upwardly directed fluid flow, to force catalyst particulates 10 to actively circulate through a charge of digesting cellulosic biomass solids may ensure adequate catalyst distribution as well as advantageously reduce thermal gradients that may occur during hydrothermal digestion. As a further advantage, active circulation of catalyst particulates 10 may address the problem created by the production of cellulosic biomass fines, since they may be co-circulated with catalyst particulates for continued digestion to take place in hydrothermal digestion unit 2.

The upwardly directed fluid flow may comprise a gas stream, a liquid stream, or any combination thereof. Also, the upwardly directed fluid flow may comprise one upwardly directed fluid stream, or two upwardly directed fluid streams, or three upwardly directed fluid streams, or four upwardly directed fluid streams, or five upwardly directed fluid streams.

At least some of the one or more upwardly directed fluid streams may contain catalyst particulates at its source. That is, the fluid stream(s) may comprise a stream of catalyst particulates. The one or more upwardly directed fluid streams may convey catalyst particulates therein. In other circumstances, the one or more upwardly directed fluid streams may not contain catalyst particulates at its source, but they may still fluidize catalyst particulates located in or near the cellulosic biomass solids.

The one or more upwardly directed fluid streams may comprise a gas stream. For example, a gas stream being used for upwardly directed fluid flow may comprise a stream of molecular hydrogen. Steam, or an inert gas such as nitrogen, for example, may be used in place of or in addition to a stream of molecular hydrogen. Up to about 40% steam may be present in the fluid stream.

The one or more upwardly directed fluid streams may comprise a liquid stream, particularly when it is not necessarily desired to maintain catalyst particulates in the cellulosic biomass solids and/or a gas stream alone is insufficient to distribute catalyst particulates, for example. Unlike a gas stream, a liquid stream may convey catalyst particulates through the cellulosic biomass solids, add to the liquid head surrounding the cellulosic biomass solids, and eventually spill over. In other circumstances, catalyst fluidization may be incomplete, and a liquid stream may still not convey catalyst particulates completely through the cellulosic biomass solids before the liquid head spills over.

As such, in certain instances, at least a portion of the liquid head may be circulated through the cellulosic biomass solids. Suitable hydrothermal digestion units configured for circulating a liquid phase therethrough, such as hydrothermal digestion unit 2 depicted in FIG. 1, are described in commonly owned United States Patent Application 20140004015, (PCT/US2013/048212) and incorporated herein by reference in its entirety. Specifically, hydrothermal digestion unit 2 may comprise a fluid circulation loop through which the liquid phase and optionally catalyst particulates 10 are circulated for distribution in the cellulosic biomass solids.

Another way to distribute catalyst particulates 10 is to convey at least a portion comprising phenolics of the content of hydrothermal digestion unit 2 to a point above at least a portion of the cellulosic biomass solids and release that portion. Because catalyst particulates 10 can have the tendency to accumulate around phenolics, particularly if the phenolics aggregate to form a phenolics liquid phase, providing this phenolics portion above cellulosic biomass solids in hydrothermal digestion unit 2 can act to release catalyst particulates for downward percolation through the cellulosic biomass solids. Techniques for downward percolation of catalyst particulates and phenolics are described in commonly owned United States Patent Application 20140117276 filed Oct. 31, 2012, entitled "Methods and Systems for Distributing a Slurry Catalyst in Cellulosic Biomass Solids" and U.S. Patent Publication No. 20140174432, filed on Dec. 17, 2013, the disclosures of which are incorporated herein by reference in their entirety.

As shown in FIGS. 1-3, the first reaction product formed by heating the first reaction content in hydrothermal digestion unit 2 may be conveyed via line 12 to a first reactor in a second reaction zone, which is phenolics conversion unit 16. The first reaction product is part of a second reaction content which is provided to phenolics conversion unit 16. The second reaction content further comprises catalyst capable of activating molecular hydrogen, and molecular hydrogen. The second reaction content subsequent to the initial materials provided to phenolics conversion unit 16 can also comprise a phenolics portion, which will be further discussed below. The second reaction content is heated in phenolics conversion unit 16 to form a second reaction product comprising unconverted phenolics, hydrocarbons converted from phenolics. Optionally, the second reaction product can also comprise monohydric alcohols converted from triols and glycol in the alcoholic component in the first reaction product.

Referring to FIGS. 1-3, the second reaction product formed by heating the second reaction content in hydrothermal digestion unit 2 may be conveyed via line 36 to a second reactor in a second reaction zone, which is phenolics conversion unit 26. The second reaction product is part of a third reaction content which is provided to phenolics conversion unit 26. The third reaction content further comprises catalyst capable of activating molecular hydrogen, and molecular hydrogen. The third reaction content subsequent to the initial materials provided to phenolics conversion unit 26 can also comprise a phenolics portion, which will be further discussed below. The third reaction content is heated in phenolics conversion unit 26 to form a third reaction product comprising unconverted phenolics, hydrocarbons converted from phenolics. Optionally, the third reaction product can also comprise monohydric alcohols converted from triols and glycol in the alcoholic component in the first reaction product. While FIGS. 1-3 shows two phenolics conversion units 16 and 26 in the first reaction zone, it is understood that the second reaction zone can comprise any suitable number of reactors coupled to one another, such as at least three, four, five, six, or more phenolics conversion units.

Referring to FIG. 1, the first reaction product may be provided to phenolics conversion unit 16 and the second reaction product may be provided to phenolics conversion unit 26 without passing through any catalyst removal mechanism, as compared to FIG. 2 or 3, where catalyst removal unit 17 is employed. As such, at least some catalyst particulates 10 may be accumulated in at least one of the first reaction product and the second reaction product coming to the reactors in the second reaction zone, e.g., phenolics conversion units 16 and 26, particularly when hydrothermal digestion unit 2 is a slurry reactor. As such, when catalyst is not removed the first and second reaction products, such as that shown in FIG. 1, the catalyst capable of activating molecular hydrogen provided to phenolics conversion unit 16 may also comprise fluidly mobile catalyst particles. As shown, the second reaction zone has more than one phenolics conversion units, phenolics conversion unit 16 and phenolics conversion unit 26. The phenolics conversion units 16 and 26 can be any combination of a slurry reactor or an ebullating bed reactor. For instance, both units can be slurry reactors, both phenolic conversion units can be ebullating bed reactors, or the phenolic conversion units can be a combination of slurry and ebullating bed reactors. The methods for distributing catalyst particles described above with respect to hydrothermal digestion unit 2 are also applicable for distributing catalyst particles through the second reaction content in phenolics conversion unit 16.

In FIG. 1, both the reactor(s) in the first reaction zone, e.g., hydrothermal digestion unit 2, and the reactors in the second digestion zone, e.g., phenolics conversion units 16 and 26, may all use the same fluidly mobile catalyst particles, such as slurry reactors or ebullating bed reactors. For example, hydrothermal digestion unit 2 and phenolics conversion units 16 and 26 may all be slurry reactors. Hydrothermal digestion unit 2 and phenolics conversion units 16 and 26 may all be ebullating bed reactors.

In FIG. 1, the reactor(s) in the first reaction zone, e.g., hydrothermal digestion unit 2, and the reactors in the second reaction zone, e.g., phenolics conversion units 16 and 26, may be reactors using different fluidly mobile catalyst particles, such as any combination of at least one slurry reactor and at least one ebullating bed reactor. For example, hydrothermal digestion unit 2 may be a slurry reactor and phenolics conversion units 16 and 26 may both be ebullating bed reactors, or an ebullating bed reactor and a slurry reactor. A further example includes hydrothermal digestion unit 2 may be an ebullating bed reactor and phenolics conversion units 16 and 26 may both be slurry reactors, or an ebullating bed reactor and a slurry reactor.

The catalyst provided to at least one of phenolics conversion units 16 and 26 can comprise catalyst particles 10 in the first reaction product coming from hydrothermal digestion unit 2, particularly when hydrothermal digestion unit 2 is a slurry reactor. That is, providing the first reaction product to phenolics conversion unit 16 and the second reaction product to phenolics conversion unit 26 can also provide the catalyst capable of activating molecular hydrogen for the second reaction content and the third reaction content, respectively. Fresh catalyst may or may not be provided to at least one of phenolics conversion units 16 and 26. Additional catalyst may also be provided to at least one of phenolics conversion units 16 and 26 to supplement catalyst particles 10 from hydrothermal digestion unit 2, if desired. The composition of the additional catalyst provided to at least one of phenolics conversion units 16 and 26 can be different from the composition of catalyst particles 10, particularly if the phenolics conversion unit receiving additional catalyst is an ebullating bed reactor. For instance, catalyst provided to phenolics conversion unit 16 can comprise material(s) that is optimized for hydrogen generation, meaning a criteria for selection of the catalyst material(s) for phenolics conversion unit 16 is relative yields of molecular hydrogen. Meanwhile, catalysts provided to phenolics conversion unit 26 can comprise material(s) that is optimized for lignin reversion, meaning a criteria for selection of the catalyst material(s) for phenolics conversion unit 26 is relative yields of hydrocarbons. It is understood that the reverse is also an option where catalyst provided to phenolics conversion unit 16 can comprise material(s) that is optimized for lignin reversion and catalyst provided to phenolics conversion unit 26 can comprise material(s) that is optimized for hydrogen generation.

FIG. 2 is similar to FIG. 1, except that system 1 now includes catalyst removal unit 17 to remove catalyst particulates 10, if any, in the second reaction product before it is routed phenolics conversion unit 26, particularly when hydrothermal digestion unit 2 is a slurry reactor. Removal of catalyst particulates 10 may take place by any technique known to one having ordinary skill in the art and may include, for example, filtration, centrifugation, hydroclone separation, settling, any combination thereof, and the like. That is, catalyst removal unit 17 may comprise any suitable equipment for the selected technique to removal catalyst known to one having ordinary skill in the art. In FIG. 2, the second reaction product is routed to catalyst removal unit 17 via line 36. After catalyst removal, the first reaction product can continue on to phenolics conversion unit 26 via line 34. The removed catalyst particles can be provided to hydrothermal digestion unit 2 via line 28 for further use as a digestion solvent. As such, during operation of system 1, the second reaction content provided to hydrothermal digestion unit 2 can also comprise recycled catalyst particles 10 coming from catalyst removal unit 17.

Return of catalyst particulates 10 may occur continuously or in batch mode. Fluid flow may be used to return catalyst particulates 10 to the cellulosic biomass solids. For example, catalyst particulates 10 may be carried by a stream of the digestion solvent provided to hydrothermal digestion unit 2, a stream of the portion of the unconverted phenolics routed back to hydrothermal digestion unit 2, or any combination thereof. Catalyst particulates 10 may be at least partially regenerated after being removed from the first reaction product. Regeneration may be desirable if the catalytic activity is not sufficiently high, for example. Hydrothermal reaction in at least one of phenolics conversion units 16 and 26 can also provide regeneration of the catalyst.

FIG. 3 also includes catalyst removal unit 17 and additionally provides an illustrative way to reduce the volume of the first reaction product that is subject to catalyst removal. FIG. 3 is similar to FIG. 2 except that as shown in FIG. 3, the second reaction product may be routed first to flasher 30, via line 36, before going to catalyst removal unit 17. Flasher 30 provides an overhead fraction from the first reaction product, where the overhead fraction comprises compounds that are lighter than water, e.g., compounds with a normal boiling point of less than 100 degrees C. Non-limiting illustrative compounds lighter than water include hydrogen, carbon dioxide, and light alcohols, including methanol and ethanol. The overhead fraction preferably comprises compounds lighter than water in an amount of at least 2%, at least 5%, at least 10%, or at least 25% by weight based on the total weight of the first reaction product. The remaining portion of the first reaction product exiting flasher 30 is a bottoms fraction that is now reduced in volume as compared to the first reaction product in line 12. Flasher 30 can be any suitable flasher known to one of ordinary skill in the art that can provide an overhead fraction and a bottoms fraction as described. For instance, a suitable flasher can apply heat and/or pressure to obtain the desired overhead fraction and bottoms fraction.

At least a portion of the overhead fraction can be provided via line 13 to phenolics conversion unit 16 and/or it can be provided via line 25 to separation zone 20 and/or it can be optionally provided directly to further processing zone 22 via line 19. The bottoms fraction can be routed via line 32 to catalyst removal unit 17. The reduced volume provided to catalyst removal unit 17 via line 32 in FIG. 3 relative to the volume provided by line 12 in FIG. 2 can increase catalyst removal efficiency of unit 17, particularly if it employs a filter mechanism. This is because filter mechanisms generally are not as efficient when filtering a multiphase mixture versus a single phase mixture. As such, flasher 30 can provide a bottoms fraction that has at least a portion of the vapor phase removed in the overhead fraction. The bottoms fraction with the catalyst removed can be provided to phenolics conversion unit 26 via line 21. As shown in FIG. 3, at least a portion of the overhead fraction from flasher 30 and bottoms fraction after catalyst removal from unit 17 can be combined then provided to phenolics conversion unit 26. Alternatively or additionally, they can be individually provided to phenolics conversion unit 26.

Like FIG. 1, in FIGS. 2 and 3, the reactor(s) in the first reaction zone, e.g., hydrothermal digestion unit 2, and the reactors in the second digestion zone, e.g., phenolics conversion units 16 and 26, may all use the same fluidly mobile catalyst particles or they may use different fluidly mobile catalyst particles as described above. Catalyst removal such as that provided by catalyst removal unit 17 in FIGS. 2 and 3 can allow for reactors coupled to one another in the second reaction zone to employ catalysts of different mobility, e.g., fluidly mobile particles versus non-fluidly mobile catalysts Additionally or alternatively, this may also be achieved by employing an ebullating bed reactor in the second reaction zone, e.g., phenolics conversion unit 16, that provides a second reaction product and fixed bed and/or or trickle bed reactors in a reactor that receives the second reaction product, e.g., phenolics conversion unit 26.

Referring to FIG. 2 or 3, inclusion of catalyst removal unit 17 allows for selection of a catalyst for use in phenolics conversion unit 16 and phenolics conversion unit 26 to be based on different properties. For instance, the catalyst for unit 16 can be selected at least based on properties that would make it suitable or optimal for lignin reversion, e.g., conversion of lignin derived phenolics to hydrocarbons and optionally of triol or glycol to monohydric alcohol. The catalyst for unit 26 can be selected at least based on properties that would make it suitable or optimal for hydrogen generation, or vice versa. Likewise, this is applicable to the arrangement in FIG. 1 when phenolics conversion unit 16 is an ebullating bed reactor as mentioned above.

Accordingly, if the second reaction zone has more than one phenolics conversion unit, these units can be any combination of a fixed bed reactor, a trickle bed reactor, a slurry reactor, or an ebullating bed reactor. For instance, all phenolics conversion units can be fixed bed reactors, all phenolics conversion units can be trickle bed reactors, all phenolics conversion units can be slurry reactors, all phenolics conversion units can be ebullating bed reactors, or the phenolics conversion units can be a combination of a fixed bed reactor, a trickle bed reactor, a slurry reactor, and/or an ebullating bed reactor. If the second reaction zone of a system described herein has a phenolics conversion unit that is a fixed bed reactor or a trickle bed reactor receiving a second reaction product from a reactor with fluidly mobile catalyst particulates, the system can employ a configuration and/or mechanism that minimizes catalyst particulates from entering the phenolics conversion unit that is a fixed bed or trickle bed reactor. An illustrative mechanism can be catalyst removal unit 17 as described in FIG. 2 or 3. An illustrative configuration can be providing a second reaction product coming from a phenolics conversion unit that is an ebullating bed reactor, particularly when a catalyst removal system is not employed, such as that shown in FIG. 1.

Referring to FIGS. 1-3, if phenolics conversion units 16 and 26 employ catalyst of different mobility, one can be configured to provide conversion of hydrocarbons from phenolics, and the other can be configured to generate molecular hydrogen. For example, under certain circumstances, phenolics conversion unit 16 or 26 can be operated at intensified catalyst concentration as compared to hydrothermal digestion unit 2, which leads to generation of more hydrogen. One instance where this can be achieved is when both hydrothermal digestion unit 2 and phenolics conversion unit 16 are slurry reactors and phenolics conversion unit 16 has a smaller reactor volume. When the first reaction product with catalyst particulates accumulated therein is provided to phenolics conversion unit 16, there would be a higher or intensified activity because of the higher catalyst concentration due to the reduction in reactor volume. As such, the reduction in reactor volume size can provide for higher catalyst activity per reactor unit volume and thus lower reactor cost. Another instance is adding fresh catalyst to a reactor in the second reaction zone to increase the catalyst concentration to intensify the catalytic activity. For instance, fresh catalyst added to phenolics conversion unit 16 and/or 26 can have the same composition as that of the catalyst in hydrothermal digestion unit 2 and/or each other. Additionally or alternately, it can have a different composition, particularly materials that can facilitate or enhance hydrogen generation. Additionally or alternately, if phenolics conversion unit 16 is configured for hydrogen generation, it can be operated at a pressure that is lower than a pressure of hydrothermal digestion unit 2. The lower pressure differential between hydrothermal digestion unit 2 and phenolics conversion unit 16 drives the reaction to generate molecular hydrogen. For example, phenolics conversion unit 16 can have a pressure that is 5 to 15 bar lower than a pressure in hydrothermal digestion unit 2. In particular, phenolics conversion unit 16 can have a pressure of lower than 200 bar. Accordingly, by configuring phenolics conversion unit 16 to generate molecular hydrogen, it is possible to generate some or all the molecular hydrogen needed by a system described herein in phenolics conversion unit 16, allowing for the option of eliminating the need to import hydrogen derived from other sources.

Referring to FIGS. 1-3, if phenolics conversion unit 16 is configured for hydrogen generation, then phenolics conversion unit 26 can be operated at conditions that are suitable or optimal for conversion of phenolics to hydrocarbons, or vice versa. In general, if a phenolics conversion unit is operated at a higher temperature than hydrothermal digestion unit 2, there is a tendency for the reaction in that phenolics conversion unit to generate more molecular hydrogen. Increasing the total pressure of the phenolics conversion unit configured for lignin reversion with hydrogen can help minimize hydrogen formation. For example, phenolics conversion unit 26 can have a total pressure of at least 200 bar where hydrogen is preferably used to achieve the desired total pressure. While any embodiment described herein can include operation of reactor(s) in the second reaction zone, e.g., phenolics conversion unit 16 or 26, with a total pressure of at least 200 bar, configurations where the reactor(s) in the second reaction zone use catalysts that do not comprise fluidly mobile catalyst particulates, e.g., fixed bed reactor or trickle bed reactor, are more suitable.

Referring to FIGS. 1-3, heating of the second and third reaction contents in phenolics conversion unit 16 and 26, respectively, hydrotreat compounds in the first reaction product that are hydrotreatable but had not been hydrotreated in hydrothermal digestion unit 2. In particular, heating of the second and third reaction contents provides for conversion of at least a portion of the phenolics in phenolics conversion units 16 and 26, respectively, to hydrocarbons, and optionally, conversion of at least a portion of triol and glycol to monohydric alcohol. The reaction content in phenolics conversion units 16 and 26 is heated to a temperature that may be in a range of about 210 to 300 degrees C., such as in a range of 270 to 290 degrees C. or at least 270 degrees C. They can but are not required to have the same pressure. For instance, the reaction content in a phenolics conversion unit can be heated to about 210, 215, 220, 225, 230, 235, 240, 245, 250, 255, 260, 265, 270, 275, 280, 285, 290, 295, or 300 degrees C. In a particular embodiment, a temperature of the second and third reaction products at an outlet of the respective phenolics conversion unit is greater than a temperature of the first reaction product at an outlet of hydrothermal digesetion unit 2. The hydrotreating of the second or third reaction contents in phenolics conversion unit 16 or 26, respectively, can also provide for regeneration of catalyst particulates accumulated in the first reaction product, if they are present.

In FIGS. 1-3, phenolics conversion units 16 and 26 are preferably in a pressurized state. They can but are not required to have the same pressure. For example, at least one of phenolics conversion unit 16 and 26 may have a pressure of at least about 30 bar, such as at least about 45 bar, at least about 60 bar, at least about 75 bar, at least about 90 bar, at least about 100 bar, at least about 110 bar, at least about 120 bar, or at least about 130. At least one of phenolics conversion units 16 and 26 may have a pressure of at most about 450 bar, such as at most about 330 bar, at most about 200 bar, at most about 175 bar, at most about 150 bar, or at most about 130 bar. As such, at least one of phenolics conversion units 16 and 26 may have a pressure in a range of about 30 to 450 bar, such as a range of about 45 and 330 bar or in a range of about 75 to 130 bar. Hydrogen is preferably used to achieve the desired total pressure of phenolics conversion unit 16 and/or 26. For instance, hydrogen partial pressure of greater than 5 bar, greater than 10, or greater than 25 bar can be provided to phenolics conversion unit 16 to achieve the desired total pressure.

Referring to FIGS. 1-3, the reaction content in phenolics conversion units 16 and 26 may be heated for at least 30 minutes and up to 10 hours, such as 120 minutes to 300 minutes. They can but are not required to have the same heating duration. For example, heating in a phenolics conversion unit may be carried out for at least 30 minutes, at least 60 minutes, at least 120 minutes, at least 180 minutes, at least 240 minutes, at least 300 minutes, at least 360 minutes, at least 420 minutes, at least 480 minutes, at least 540 minutes, or at least 600 minutes. Heating in a phenolics conversion unit may be carried out at most 600 minutes, at most 540 minutes, at most 480 minutes, at most 420 minutes, at most 360 minutes, at most 300 minutes, at most 240 minutes, at most 180 minutes, at most 120 minutes, at most 60 minutes, or at most 30 minutes.

The hydrothermal reaction carried out in phenolics conversion units 16 and 26 can provide for conversion of lignin-derived phenolics into desirable hydrocarbons that can be used in a fuel blends, such as gasoline. Illustrative, non-limiting hydrocarbon compounds include alkane and/or alkenes, such as, respectively, cycloalkanes and its alkyl substituents or derivatives and cycloalkenes and its alkyl substituents or derivatives, which can be suitable for use in fuel composition, for instance gasoline or diesel. For instance, illustrative hydrocarbon compounds can include but are not limited to cyclohexane, cyclohexene, propyl cyclopentane, propyl cyclopentene, propyl cyclohexane, propyl cyclohexene, anisole, propyl benzene, cyclohexanone, methyl cyclohexanone, and methyl propyl benzene. The conversion of lignin derived phenolics into desirable hydrocarbons may not be complete, which can leave unconverted phenolics still remaining in the second reaction product. Optionally, the hydrothermal reaction carried out in phenolics conversion units 16 and 26 can also provide for hydrodeoxygenation where triols and glycol of the alcoholic component are converted to monohydric alcohol. The hydrodeoxygenation may not be complete, which can leave triols and glycol still remaining in the second reaction product. As such, the second reaction product can comprise unconverted phenolics, hydrocarbons converted from phenolics, and at least a portion of the alcoholic component.

Methanol can also be generated when heating the first reaction product to a temperature of at least about 250° C. Without being bound by any theory or mechanism, it is believed that the methanol formation occurred due to cleavage of at least some of the phenolic methyl ethers on the lignin polymer backbone. The methanol, which is a monohydric alcohol, may be transformed into fuel blends and other materials through downstream further processing reactions, such as those that take place in further processing zone 22 discussed further below.

Referring to FIGS. 1-3, the third reaction product formed by heating the third reaction content in phenolics conversion unit 26 can be routed, via line 18, from phenolics conversion unit 26 in the second reaction zone to separation zone 20. In separation zone 20, a phenolics fraction comprising unconverted phenolics is separated from the third reaction product, which can be provided to a reactor in the first reaction zone and a reactor in the second reaction zone. The fraction can be referred to as an unconverted phenolics fraction. The remaining fraction of the third reaction product comprising hydrocarbons and alcoholic component, where the hydrocarbons can be further separated and/or remain with the alcoholic component for further processing in zone 22. It is understood that the phenolics fraction contain some hydrocarbons and alcoholic component, and vice versa, where the remaining fraction of the third reaction product can comprise phenolics. The difference between the two fractions is that the remaining fraction of the third reaction product contains less than 50%, less than 25%, or less than 10% of the total amount of phenolics in the third reaction product provided to separation zone 20 via line 18. Accordingly, the phenolics fraction contains more than 50%, more than 75%, or more than 90% of the total amount of phenolics in the third reaction product.

Separation zone 20 can comprise any suitable separation mechanism known to one of ordinary skill in the art to provide the phenolics fraction and the remaining fraction of the second reaction product. For instance, separation zone 20 can comprise a mechanism that separates the compounds based on certain properties, such as boiling point and miscibility. Moreover, it is understood that separation zone 20 may comprise more than one unit and/or stages to achieve the desired separation and fractions. While not shown, glycol in the second reaction product may be separated and used to increase the glycol content of the digestion solvent in hydrothermal digestion unit 2.

As mentioned, the hydrothermal reaction in phenolics conversion units 16 and 26 hydrotreat compounds that are hydrotreatable, including certain phenolics and alcoholic components, to produce hydrocarbons, such as alkanes and alkenes, and optionally, monohydric alcohol. The further hydrotreatment can provide for better separation between unconverted phenolics and desirable components such as hydrocarbons and monohydric alcohols, which are lighter than the unconverted phenolics. For instance, the amount of phenolics that need to be separated downstream is reduced via conversion to hydrocarbons. Further, the amount of glycol and triols is also reduced via conversion to monohydric alcohols, which have boiling points further away from the boing points of phenolics as compared to glycol and triols, thereby facilitating separation of phenolics, at least based on boiling points.

In particular, in FIGS. 1-3, the phenolics fraction is provided to hydrothermal digestion unit 2 via line 11, and it is provided to phenolics conversion unit 26 via line 46. Additionally or alternately, the phenolics fraction can be provided to phenolics conversion unit 16 via line 48. The portion of phenolics fraction provided to hydrothermal digestion unit 2 in the first reaction zone can serve as a portion of the first reaction content, particularly as part of the digestion solvent. The portion of phenolics fraction provided to phenolics conversion unit 26, and optionally, unit 16, in the second reaction zone can be part of the third reaction content, or optionally, the second reaction content, respectively, particularly to provide unconverted phenolics for further reversion to hydrocarbons. As such, during operation of system 1, the first reaction content provided to hydrothermal digestion unit 2 and the third reaction content provided to phenolics conversion unit 26 and optionally the second reaction content provided to phenolics conversion unit 16 can also comprise recycled unconverted phenolics in the phenolics fraction coming from separation zone 20.

As shown in FIG. 1, the portion of phenolics fraction optionally provided to phenolics conversion unit 16 in the second reaction zone via line 48 may be combined with the first reaction product from hydrothermal digestion unit 2 in the first reaction zone provided via line 12 before both enter unit 16. Alternatively or additionally, the unconverted phenolics coming from separation zone 20 may be optionally provided to phenolics conversion unit 16 separately from the first reaction product. Likewise, the portion of phenolics fraction provided to phenolics conversion unit 26 in the second reaction zone via line 46 may be combined with the second reaction product from phenolics conversion unit 16 provided via line 36 before both enter unit 26. Alternatively, or additionally, the unconverted phenolics coming from separation zone 20 may be provided to phenolics conversion unit 26 separately from the second reaction product.

As shown in FIG. 2, the portion of phenolics fraction optionally provided to phenolics conversion unit 16 in the second reaction zone via line 48 may be combined with the first reaction product from hydrothermal digestion unit 2 in the first reaction zone provided via line 12 before both enter unit 16. Alternatively or additionally, the unconverted phenolics coming from separation zone 20 may be optionally provided to phenolics conversion unit 16 separately from the first reaction product. The portion of phenolics fraction provided to phenolics conversion unit 26 via line 46 may be combined with the second reaction product after catalyst removal by unit 17 provided via line 34 before both enter unit 26. Alternatively, or additionally, the unconverted phenolics coming from separation zone 20 may be provided to phenolics conversion unit 26 separately from the second reaction product coming from catalyst removal unit 17.

As shown in FIG. 3, the portion of phenolics fraction optionally provided to phenolics conversion unit 16 in the second reaction zone via line 48 may be combined with the first reaction product from hydrothermal digestion unit 2 in the first reaction zone provided via line 12 before both enter unit 16. Alternatively or additionally, the unconverted phenolics coming from separation zone 20 may be optionally provided to phenolics conversion unit 16 separately from the first reaction product. The portion of phenolics fraction provided to phenolics conversion unit 26 via line 46 may be combined with at least a portion of the overhead fraction from flasher 30 provided by line 13 and the bottoms fraction from flasher 30 after catalyst removal by unit 17 provided by line 21 before all three enter unit 16. Alternatively or additionally, at least one of at least a portion of the overhead fraction of the second reaction product, the bottom fraction of the second reaction product after catalyst removal by unit 17, and the phenolics fraction coming from separation zone 20 may be combined prior to being provided to phenolics conversion unit 26. Alternatively or additionally, these components can be provided individually to phenolics conversion unit 26.

As mentioned above, the first reaction product and optionally provided phenolics fraction coming from separation zone 20 can be provided to phenolics conversion unit 16 in any suitable manner and amount, as long as the concentration of phenolics of the second reaction content provided to phenolics conversion unit 16 is 50% or less by weight based on the total weight of the content of the second hydrothermal reaction in unit 16. Similarly, the at least a portion of the overhead fraction of the second reaction product, the bottom fraction of the second reaction product after catalyst removal by unit 17, and the phenolics fraction coming from separation zone 20 can be provided to phenolics conversion unit 26 in any manner and amount as long as the concentration of phenolics of the third reaction content is 50% or less by weight based on the total weight of the content of the third hydrothermal reaction in unit 26. Non-limiting illustrative phenolics concentrations of the reaction content in the second or third hydrothermal reaction can be in a range of about 0.1% to 50% by weight, and any amount in between, including less than 45%, less than 40%, less than 35%, less than 30%, less than 25%, less than 20%, less than 15%, less than 10%, or less than 5% by weight, based on the total content weight of the second or third hydrothermal reaction, respectively.

Lignin reversion, including conversion of lignin to phenols and/or conversion of phenolics to hydrocarbon compounds, can be improved if the conversion is accomplished in the presence of water. That is the phenolics concentration in the second hydrothermal reaction of 50% or less by weight of the content of the second hydrothermal reaction can be achieved at least in part with water. For instance, the concentration of water in the second hydrothermal reaction can be at least 10% by weight based on the total weight of the content of the second hydrothermal reaction. Non-limiting illustrative water concentration of the reaction content in the second hydrothermal reaction can be at least 10%, at least 15%, at least 20%, at least 25%, at least 30%, at least 35%, or at least 40% by weight, based on the total content weight of the second hydrothermal reaction.

Referring to FIGS. 1-3, the remaining fraction of the third reaction product after separation zone 20 that comprises hydrocarbons and alcoholic component can be provided, via line 24, to further processing zone 22, where one or more further processing reactions may take place to generate biofuels. Further processing zone 22 can comprise any suitable number of reactors coupled to one another, such as at least one, two, three, four, five, or six further processing units. The reaction(s) taking place in further processing zone 22 can convert the alcoholic component to the desired hydrocarbon compounds. While not shown, hydrocarbons converted from phenolics that are in the second reaction product may be separated from the second reaction product before it is routed to further processing zone 22, or the hydrocarbons may remain in the second reaction product and go through further processing zone 22 as described herein. Also, hydrogen and water vapor may or may not be removed prior to the further processing of the remaining fraction.

Optionally, the third reaction product exiting phenolics conversion unit 26 may be optionally subject to a flashing step in separation zone 20 prior to the remaining fraction entering further processing zone 22 via line 24. The flashing step may be carried out at a higher pressure than a pressure of further processing zone 22. For example, the flashing step may be carried out at a pressure of at least about 5 bar, such as greater than 20 bar, greater than 30 bar, greater than 4 bar, or greater than 50 bar. Such a flashing step vaporizes hydrocarbons converted from phenolics and alcoholic component and provides them as vapor to further processing zone 22. To facilitate the flashing, the second reaction product may be optionally heated prior to entering separation zone 20. For instance, the second reaction product may be provided to separation zone at a temperature of greater than 200 degrees C., greater than 300 degrees C., or greater than 400 degrees C. It is understood that separation zone 20 may also be operated at a lower pressure than further processing zone 22. The flashing and optional heating of the second reaction product as described can provide for better energy integration and efficiency because the compounds routed to further processing zone 22 are provided at a pressure that is the same or higher than the target pressure of further processing zone 22 as compared to other ways that may involve condensation of the remaining fraction exiting via line 24 and vaporization to provide it to further processing zone 22 at or above the target pressure.

Referring to FIGS. 1-3, further processing zone 22 may generally comprise a condensation reaction, often conducted in the presence of a condensation catalyst, in which the alcoholic component or a product formed therefrom is condensed with another molecule to form a higher molecular weight compound. As used herein, the term "condensation reaction" will refer to a chemical transformation in which two or more molecules are coupled with one another to form a carbon-carbon bond in a higher molecular weight compound, usually accompanied by the loss of a small molecule such as water or an alcohol. An illustrative condensation reaction is the Aldol condensation reaction, which will be familiar to one having ordinary skill in the art.

Although a number of different types of catalysts may be used for mediating condensation reactions, zeolite catalysts also may be particularly advantageous in this regard. One zeolite catalyst that may be particularly well suited for mediating condensation reactions of alcohols is ZSM-5 (Zeolite Socony Mobil 5), a pentasil aluminosilicate zeolite having a composition of $Na_nAl_nSi_{96-n}O_{192} \cdot 16H_2O$ (0<n<27), which may transform an alcohol feed into a condensation product. Other suitable zeolite catalysts may include, for example, ZSM-12, ZSM-22, ZSM-23, SAPO-11, and SAPO-41.

In various embodiments, the condensation reaction may take place at a temperature ranging between about 275 degrees C. and about 450 degrees C. The condensation reaction may take place in a condensed phase (e.g., a liquor phase) or in a vapor phase. For condensation reactions taking place in a vapor phase, the temperature may range between about 300 degrees C. and about 400 degrees C., such as 350 degrees C. or above. The condensation reaction may take place at a pressure in a range of about 5 bar to 50 bar, such as 10 bar to 30 bar, including about 15 bar to 20 bar.

The alcoholic component, particularly when it includes methanol and an oxygenate, such as such as at least one of ketones, aldehydes, furans, and ethers, can provide for improved conversion of methanol over to a fuel compound, such as gasoline or diesel, as compared to other conventional methanol conversion processes. An example of such a conventional methanol conversion process is the methanol-to-gasoline process.

In conventional methanol to gasoline process, methanol is typically converted to gasoline in a two-step process. The first step is dehydrating the methanol to form an equilibrium mixture of dimethylether (DME), methanol, and water. The second step is to pass the mixture over ZSM-5 to produce hydrocarbons, water, and a gas phase of light hydrocarbons. These light hydrocarbons are typically recycled through the second step to be combined with the mixture, and the combined product is passed over ZSM-5. If dehydrating is not performed first, then conversion of methanol tend to be heavily weighted to the light hydrocarbons products and gasoline yield is low. The methanol-to-gasoline process adjusts for this by recycling the light hydrocarbons which improves overall gasoline yields.

Unlike the conventional methanol-to-gasoline process, the combination of methanol and an oxygenate can help shift the product distribution from light hydrocarbons toward higher hydrocarbon compounds yield. In particular, the alcoholic component containing methanol and an oxygenate, such as at least one of ketones, aldehydes, furans, and ethers, may be converted to a fuels product, such as gasoline, without first conducting a dehydrating reaction to form dimethylether (DME).

The higher molecular weight compound produced by the condensation reaction may comprise $>C_4$ hydrocarbons, such as $C_4$-$C_{30}$ hydrocarbons, $C_4$-$C_{24}$ hydrocarbons, $C_4$-$C_{18}$ hydrocarbons, or $C_4$-$C_{12}$ hydrocarbons; or $>C_6$ hydrocarbons, such as $C_6$-$C_{30}$ hydrocarbons, $C_6$-$C_{24}$ hydrocarbons, $C_6$-$C_{18}$ hydrocarbons, or $C_6$-$C_{12}$ hydrocarbons. Consistent with other definitions provided herein, the term "hydrocarbons" refers to compounds containing both carbon and hydrogen without reference to other elements that may be present, except they do not include a phenolic functional group. The particular composition of the higher molecular weight compound produced by the condensation reaction may vary depending on the catalyst(s) and temperatures used for both the catalytic reduction reaction and the condensation reaction, as well as other parameters such as pressure.

A single catalyst may mediate the transformation of the alcoholic component into a form suitable for undergoing a condensation reaction as well as mediating the condensation reaction itself. Zeolite catalysts are one type of catalyst suitable for directly converting alcohols to condensation products in such a manner A particularly suitable zeolite catalyst in this regard may be ZSM-5, although other zeolite catalysts may also be suitable.

On the other hand, a first catalyst may be used to mediate the transformation of the alcoholic component into a form suitable for undergoing a condensation reaction, and a second catalyst may be used to mediate the condensation reaction. Unless otherwise specified, it is to be understood that reference herein to a condensation reaction and condensation catalyst refers to either type of condensation process. Further disclosure of suitable condensation catalysts now follows. Zeolite catalysts may be used as either the first catalyst or the second catalyst. Again, a particularly suitable zeolite catalyst in this regard may be ZSM-5, although other zeolite catalysts may also be suitable.

Various catalytic processes may be used to form higher molecular weight compounds by a condensation reaction. In some embodiments, the catalyst used for mediating a condensation reaction may comprise a basic site, or both an acidic site and a basic site. Catalysts comprising both an acidic site and a basic site will be referred to herein as multi-functional catalysts. In some or other embodiments, a catalyst used for mediating a condensation reaction may comprise one or more metal atoms. Any of the condensation catalysts may also optionally be disposed on a solid support, if desired. Additional details regarding suitable catalysts are described in commonly owned U.S. patent application Ser. No. 14/067,330, filed Oct. 30, 2013, and entitled Methods and Systems for Processing Lignin During Hydrothermal Digestion of Cellulosic Biomass Solids," the entire disclosure of which is incorporated herein by reference.

For example, the condensation catalyst may also include a zeolite and other microporous supports that contain Group IA compounds, such as Li, Na, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In some embodiments, the condensation catalyst may be derived from the combination of MgO and $Al_2O_3$ to form a hydrotalcite material. Another condensation catalyst may comprise a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation reaction mediated by the condensation catalyst may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reaction.

To facilitate a better understanding of the present invention, the following examples of preferred embodiments are given. In no way should the following examples be read to limit, or to define, the scope of the invention.

EXAMPLES

Comparative Example 1

Comparative Example 1 was conducted with reactants where the phenolics concentration was greater than 90% by weight based on the total weight of the reactants.

In Comparative Example 1, a 50-ml Parr 4590 reactor equipped with flat gasket Teflon seal was charged with 25 grams of 2-methoxy-4-propylphenol (MPP), 0.1 grams of potassium carbonate buffer, and 0.2 grams of nickel-oxide promoted cobalt molybdate catalyst (DC-2534, containing 1-10% cobalt oxide and molybdenum trioxide (up to 30 wt %) on alumina, and less than 2% nickel), obtained from Criterion Catalyst & Technologies L.P., and sulfided by the method described in Example 5 of U.S. Application Publication No. 2010/0236988, the disclosure of which is incorporated by reference in its entirety. The reactor was pressured to 35 bar with $H_2$ (less than 1800 psi) and heated to 280° C. for 18 hours, before sampling for analysis of products formed. The reaction conditions of the reactor simulated possible reaction conditions of the phenolics conversion unit described herein, except in Comparative Example 1, the content has a phenolics concentration amount of greater than 50% by weight.

After sampling, the reactor was repressurized with $H_2$ to 35 bar, and heated to 300° C. again for 18 hours before sampling. A third cycle was completed with heating to 320° C. A third sampling was performed after the third cycle.

The reactor contents from the third sampling were analyzed by gas chromatography (GC) using a 60-m×0.32 mm ID DB-5 column of 1 μm thickness, with 50:1 split ratio, 2 ml/min helium flow, and column oven at 40° C. for 8 minutes, followed by ramp to 285° C. at 10° C./min, and a hold time of 53.5 minutes. The injector temperature was set at 250° C., and the detector temperature was set at 300° C. The GC analysis of the third sample is shown in Table 1 below.

TABLE 1

| Peak # | Ret Time | Area | Name | wt % |
|---|---|---|---|---|
| 1 | 11.717 | 5619961 | Propane | 0.06% |
| 2 | 11.982 | 6747590 | dimethyl ether | 0.07% |
| 3 | 12.595 | 86782182 | Methanol | 0.91% |
| 4 | 13.739 | 173280033 | Acetone | 1.82% |
| 5 | 15.267 | 4461494 | Cyclohexane | 0.05% |
| 6 | 15.787 | 5395829 | Cyclohexene | 0.06% |
| 7 | 16.808 | 230550355 | 1-butanol | 2.43% |
| 8 | 18.937 | 4105220 | propyl cyclopentane | 0.04% |
| 9 | 19.378 | 3171558 | propyl cyclopentene | 0.03% |
| 10 | 21.391 | 74035576 | propyl cyclohexane | 0.78% |
| 11 | 22.003 | 27587711 | propyl cyclohexene | 0.29% |
| 12 | 22.147 | 37170017 | propyl cyclohexene | 0.39% |
| 13 | 22.717 | 20605421 | Anisole | 0.22% |
| 14 | 22.792 | 93883327 | propyl benzene | 0.99% |
| 15 | 23.162 | 9515177 | Cyclohexanone | 0.10% |
| 16 | 23.231 | 5293978 | Cyclohexanone | 0.06% |
| 17 | 23.887 | 9261343 | methyl cyclohexanone | 0.10% |
| 18 | 24.132 | 5497001 | Unknown | 0.06% |
| 19 | 24.37 | 7327019 | methyl propyl benzene | 0.08% |
| 20 | 24.439 | 8573669 | Unknown | 0.09% |
| 21 | 24.736 | 7409868 | methyl propyl benzene | 0.08% |
| 22 | 25.39 | 4663686 | Unknown | 0.05% |
| 23 | 25.529 | 296427426 | Phenol | 3.12% |
| 24 | 25.849 | 6417719 | Unknown | 0.07% |
| 25 | 26.14 | 179442830 | methoxy phenol | 1.89% |
| 26 | 26.335 | 35159606 | dimethoxy benzene | 0.37% |
| 27 | 26.516 | 100905315 | methyl phenol | 1.06% |
| 28 | 26.645 | 179198149 | methoxy propyl benzene | 1.89% |
| 29 | 26.724 | 380334055 | methoxy propyl benzene | 4.00% |
| 30 | 26.923 | 49545038 | methyl methoxy phenol | 0.52% |
| 31 | 27.067 | 29926443 | dimethyl phenol | 0.32% |
| 32 | 27.16 | 22258594 | methyl methoxy phenol | 0.23% |
| 33 | 27.261 | 23251313 | Unknown | 0.24% |
| 34 | 27.329 | 19319037 | methoxy methypropyl benzene | 0.20% |
| 35 | 27.387 | 52729332 | methoxy methypropyl benzene | 0.56% |
| 36 | 27.491 | 12532157 | Unknown | 0.13% |
| 37 | 27.548 | 11894399 | Unknown | 0.13% |
| 38 | 27.679 | 10774905 | Unknown | 0.11% |
| 39 | 27.789 | 207630094 | propyl phenol | 2.19% |
| 40 | 27.948 | 23890742 | methoxy methypropyl benzene | 0.25% |
| 41 | 28.055 | 45934439 | Unknown | 0.48% |
| 42 | 28.163 | 12471997 | Unknown | 0.13% |
| 43 | 28.407 | 2236905437 | propyl phenol | 23.55% |
| 44 | 28.579 | 29318453 | methyl propyl phenol | 0.31% |

Example 2 (According to Aspects Described Herein)

A 450-ml Parr reactor was charged with a 20.02 grams of methoxypropylphenol and 190.01 grams of deionized water, both which served as the digestion solvent. The reactor was then charged with 0.4192 grams of KOH buffer, and with 7.2522 grams of nickel-oxide promoted cobalt molybdate catalyst (DC-2534, containing 1-10% cobalt oxide and molybdenum trioxide (up to 30 wt %) on alumina, and less than 2% nickel), obtained from Criterion Catalyst & Technologies L.P., and sulfided by the method described in Example 5 of U.S. Application Publication No. 2010/0236988.

The reactor was then charged with 14.02 grams of the pine wood of nominal 12% moisture. Nominal 52 bar of hydrogen was added, and the reactor content was heated to 190° C. for 1 hour before ramping over 15 minutes to a temperature of 245° C. for 2.5 hours, giving a total cycle time of 3.5 hours. The cycles were repeated with addition of 14.05, 14.01, 14.04, 14.02, 13.99, 14.03, and 14.00 grams of pine wood. That is, the reactor was depressurized for each cycle as new pine wood was added then the reactor content was heated as described. All the wood was digested by the end of the 8$^{th}$ cycle, which was determined by subtracting the amount of solid from the weight of the catalyst. These eight cycles simulate the hydrothermal reaction that can take place in the hydrothermal digestion unit described herein. The methoxy propyl phenol serving as part of the initial digestion solvent simulates the recycling of unconverted phenolics from the separation zone to the first reaction zone for use as part of the digestion solvent as described herein. The phenolics concentration in the reactor content was less than 50% by weight and the water concentration in the reactor content was at least 10% by weight, both based on the total weight of the reactor content. A final cycle was conducted by heating the reactor content to 270 degrees C. for 18 hours starting at 35 bar $H_2$ to simulate the hydrothermal reaction carried out in the phenolics conversion unit described herein.

After the final cycle, 289.76 grams of the reaction mixture were distilled to produce 230.5 grams of an overhead cut. An upper oily layer comprising 7% of the distilled mixture was analyzed by GCMS using a 60-m×0.32 mm ID DB-5 column of 1 μm thickness, with 50:1 split ratio, 2 ml/min helium flow, and column oven at 40° C. for 8 minutes, followed by ramp to 285° C. at 10° C./min, and a hold time of 53.5 minutes. The injector temperature was set at 250° C., and the detector temperature was set at 300° C.

The result of the GC analysis is shown below in Table 2.

TABLE 2

| Peak # | Ret Time | Area | Name | Area % |
|---|---|---|---|---|
| 1 | 13.691 | 482012956 | Cyclopentane and cyclopentene co-elute | 2.77% |
| 2 | 14.568 | 135225173 | methyl cyclopentane | 0.78% |
| 3 | 15.062 | 206801927 | methyl cyclopentene | 1.19% |
| 4 | 15.325 | 581115537 | 2-butanol | 3.34% |
| 5 | 15.775 | 84326225 | Cyclohexene | 0.48% |
| 6 | 16.044 | 92758002 | methyl THF | 0.53% |
| 7 | 16.606 | 101840672 | ethyl cyclopentane | 0.59% |
| 8 | 16.818 | 397513626 | 1-butanol | |
| 9 | 17.177 | 223913153 | methyl cyclopentene | 1.29% |
| 10 | 17.378 | 95437668 | Unknown | 0.55% |
| 11 | 17.705 | 45625586 | methyl cyclohexene | 0.26% |
| 12 | 18.932 | 57603824 | propyl cyclopentane | 0.33% |
| 13 | 19.356 | 278263405 | 1-pentanol and propyl cyclopentene co-elute | 1.60% |
| 14 | 19.513 | 83635652 | 3-hexanone | 0.48% |
| 15 | 19.796 | 47634939 | 2-hexanone | 0.27% |
| 16 | 20.094 | 246657917 | Unknown | 1.42% |
| 17 | 20.299 | 101996105 | Octahydropentalene | 0.59% |
| 18 | 20.699 | 148727253 | Cyclopentanone | 0.86% |
| 19 | 21.428 | 1113375735 | propyl cyclohexane | 6.40% |
| 20 | 21.641 | 119826018 | methyl cyclopentanone | 0.69% |
| 21 | 21.74 | 108289044 | Unknown | 0.62% |

TABLE 2-continued

| Peak # | Ret Time | Area | Name | Area % |
|---|---|---|---|---|
| 22 | 22.046 | 1021147457 | propyl cyclohexene | 5.87% |
| 23 | 22.19 | 793729707 | propyl cyclohexene | 4.57% |
| 24 | 22.337 | 177977170 | Unknown | 1.02% |
| 25 | 22.801 | 290373711 | propyl benzene | 1.67% |
| 26 | 22.958 | 119922371 | Unknown | 0.69% |
| 27 | 23.081 | 161499696 | Unknown | 0.93% |
| 28 | 23.442 | 321904495 | C9H14 | 1.85% |
| 29 | 23.596 | 329712365 | ethyl cyclopentanone | 1.90% |
| 30 | 23.938 | 148557339 | Unknown | 0.85% |
| 31 | 24.387 | 69920701 | Unknown | 0.40% |
| 32 | 24.588 | 93817820 | Unknown | 0.54% |
| 33 | 25.075 | 175481628 | hexyl cyclopentanone | 1.01% |
| 34 | 25.569 | 145092583 | Unknown | 0.83% |
| 35 | 26.165 | 154464794 | Unknown | 0.89% |
| 36 | 26.376 | 393093846 | propyl cyclohexanol | 2.26% |
| 37 | 26.503 | 860860070 | propyl cyclohexanol | 4.95% |
| 38 | 26.554 | 360807344 | Unknown | 2.08% |
| 39 | 26.695 | 198109067 | methyl propyl phenol | 1.14% |
| 40 | 26.78 | 212189594 | methoxy propyl benzene | 1.22% |
| 41 | 26.955 | 565134459 | Unknown | 3.25% |
| 42 | 27.058 | 230283141 | propyl cyclohexanone | 1.32% |
| 43 | 27.2 | 114973298 | Unknown | 0.66% |
| 44 | 27.312 | 80318805 | Unknown | 0.46% |
| 45 | 27.494 | 94638259 | ethyl phenol | 0.54% |
| 46 | 27.789 | 84629760 | Unknown | 0.49% |
| 47 | 28.221 | 110486524 | methoxy ethyl phenol | 0.64% |
| 48 | 28.475 | 2823965694 | Unknown | 16.24% |
| 49 | 28.991 | 228746231 | Unknown | 1.32% |
| 50 | 29.252 | 1591152593 | methoxy propyl phenol | 9.15% |
| 51 | 29.308 | 765453976 | methoxy propyl phenol | 4.40% |
| 52 | 29.633 | 132262581 | diethyl phenol | 0.76% |
| 53 | 29.805 | 82285232 | dimethoxy propyl benzene | 0.47% |
| 54 | 30.532 | 99103120 | Unknown | 0.57% |

Analysis

The results of Comparative Example 1 and Example 2 indicate that a second hydrothermal reaction of a reaction product of an in situ catalytic reduction reaction in the presence of molecular hydrogen and a catalyst capable of activating molecular hydrogen can provide for production of hydrocarbons from phenolics. However, the yields of hydrocarbon products can be increased if the concentration of phenolics was low and the lignin reversion, including lignin to phenols and/or conversion of phenolics to hydrocarbon compounds, takes place in the presence of water. In particular, where the content of the second hydrothermal reaction has a phenolics concentration of equal to or less than 50% by weight and a water concentration of at least 10% by weight, based on the total weight of the reaction content of the second hydrothermal reaction, at least the conversion of phenolics to hydrocarbons can be improved by about 10-fold, as shown in Example 2.

The phenolics concentration for Comparative Example 1 simulating the phenolics conversion unit described herein was greater than 90% based on total weight of the reactor content. In comparison, the phenolics concentration for the reaction simulating the phenolics conversion unit described herein in Example 2 was below 50% based on total weight of the reactor content. Example 2 provided for an estimated 65% conversion relative to the phenolics remaining unconverted. Table 2 shows that in addition to the initial digestion solvent that included methoxy propyl phenol, a range of alkanes, ketone and aldehyde monooxygenates as well as glycol solvents and products, and polyols (glycerol) were observed, with volatility greater than C6 sugar alcohol sorbitol. For instance, Table 2 shows that the amount of alkanes and alkenes observed was at least about 20.4%, which included propyl cyclohexane, propyl cyclohexene, propyl benzene, and $C_9H_{14}$. Other products observed were propyl cyclohexanol, methoxy propyl benzene, and propyl cyclohexanone.

Table 1 of Comparative Example 1 shows the amount of propyl cyclohexane was 0.78% as compared to 6.4% in Table 2; the amount of propyl cyclohexene in Table 1 was 0.68% as compared to about 10.5% in Table 2, the amount of propyl benzene in Table 1 was about 1% as compared to 1.67% in Table 2; and Table 1 did not show any trace of $C_9H_{14}$ as compared to 1.85% in Table 2. The amount of phenolics in Table 1, including propyl phenol, was about 30% as compared to about 14% in Table 2.

Accordingly, the examples indicate that a substantial portion of the phenolic compounds present as solvent or formed via digestion of wood, can be converted to hydrocarbons derived from phenolics, such as cycloalkanes and its alkyl substituents or derivatives and cycloalkenes and its alkyl substituents or derivatives via the methods and systems described herein. Moreover, these reaction products are observed to be more volatile than the unconverted phenols, as evidenced by earlier elution on the GC trace, thereby allowing for easier separation of phenolics from the reaction product and subsequent recycling as described herein.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a reactor in a first reaction zone with a first reaction content comprising cellulosic biomass solids, molecular hydrogen, a hydrogen-activating catalyst, and a digestion solvent;

heating the first reaction content in the reactor in the first reaction zone to form a first reaction product comprising phenolics and an alcoholic component;

providing a first reactor in a second reaction zone with a second reaction content comprising the first reaction product, molecular hydrogen, and a hydrogen-activating catalyst;

heating the second reaction content in the first reactor in the second reaction zone to form a second reaction product;

providing a second reactor in the second reaction zone with a third reaction content comprising the second reaction product, molecular hydrogen, and a hydrogen-activating catalyst;

heating the third reaction content in the second reactor in the second reaction zone to form a third reaction product comprising hydrocarbons converted from phenolics and unconverted phenolics;

separating an unconverted phenolics fraction from the third reaction product;

providing a first portion of the unconverted phenolics fraction to the reactor in the first reaction zone; and providing a second portion of the unconverted phenolics fraction to at least one of the first reactor and the second reactor in the second reaction zone.

2. The method of claim 1, wherein at least one of the second and third reaction contents has a concentration of phenolics of 50% or less by weight based on the total weight of the respective reaction content.

3. The method of claim 1, wherein the second reaction content has a water concentration of at least 10% by weight based on the total weight of the second reaction content.

4. The method of claim 1, wherein the unconverted phenolics fraction comprises greater than 50% of the amount of phenolics in the third reaction product from which the unconverted phenolics fraction is separated.

5. The method of claim 1, wherein at least one of the first and second reactors in the second reaction zone has a pressure of less than 200 bar.

6. The method of claim 1, wherein the alcoholic component comprises triols and glycol and wherein at least a portion of triols and glycol in the alcoholic component is converted to monohydric alcohols.

7. The method of claim 1, wherein the first reaction content is heated to a temperature in a range of about 190 to 260 degrees C.

8. The method of claim 1, wherein the second and third reaction contents are heated to a temperature in a range of about 210 to 300 degrees C.

9. The method of claim 1, wherein the reactor in the first reaction zone has a total pressure of at least 30 bar.

10. The method of claim 1, wherein the first and second reactors in the second reaction zone each has a total pressure of at least 30 bar.

11. The method of claim 1, wherein at least one of the first and second reactors in the second reaction zone has a total pressure that is lower than a total pressure of the reactor in the first reaction zone.

12. The method of claim 1, wherein the first reactor in the second reaction zone comprises an ebulatting bed reactor and the second reactor in the second reaction zone comprises a fixed bed reactor or a trickle bed reactor.

13. The method of claim 1, wherein the hydrocarbons converted from phenolics comprise at least one of an alkane, an alkene, a cycloalkane, a cycloalkene, an alkyl derivative or substituent of the cycloalkane, and an alkenealkyl derivative or substituent of the cycloalkene.

14. The method of claim 1, wherein the catalyst in at least one of the first and second reactors in the second reaction content comprises fluidly mobile catalyst particulates.

15. The method of claim 1, wherein at least one of the first reaction zone and the second reaction zone comprises a slurry reactor.

16. The method of claim 1, further comprising
increasing the catalytic activity in at least one of the first and second reactors in the second reaction zone to increase hydrogen generation.

* * * * *